US012386371B2

(12) United States Patent
Long et al.

(10) Patent No.: US 12,386,371 B2
(45) Date of Patent: Aug. 12, 2025

(54) MANAGING TEMPERATURE CONTROL OF A HEATING ELEMENT OF AN OUTDOOR FURNITURE PIECE

(71) Applicant: Outmore Living, Inc., Austin, TX (US)

(72) Inventors: Kevin Jeffrey Long, Austin, TX (US); Alex Joseph Duncan, The Woodlands, TX (US)

(73) Assignee: Outmore Living, Inc., Austin, TX (US)

( * ) Notice: Subject to any disclaimer, the term of this patent is extended or adjusted under 35 U.S.C. 154(b) by 447 days.

(21) Appl. No.: 18/060,470

(22) Filed: Nov. 30, 2022

(65) Prior Publication Data
US 2024/0176371 A1    May 30, 2024

(51) Int. Cl.
G05B 13/02    (2006.01)
G05D 23/19    (2006.01)

(52) U.S. Cl.
CPC ..... G05D 23/1917 (2013.01); G05B 13/0265 (2013.01); G05D 23/1927 (2013.01)

(58) Field of Classification Search
CPC ........... G05B 13/0265; G05D 23/1917; G05D 23/1927; A47C 7/748
USPC ....................................................... 700/300
See application file for complete search history.

(56) References Cited

U.S. PATENT DOCUMENTS

| 9,775,438 | B1 | 10/2017 | Schulenberg | |
| 2006/0289421 | A1* | 12/2006 | Axinte | H05B 3/342 219/217 |
| 2010/0025388 | A1 | 2/2010 | Ono | |
| 2010/0283295 | A1 | 11/2010 | Smith | |

(Continued)

FOREIGN PATENT DOCUMENTS

| AT | 11618 U1 | 4/2009 |
| AU | 2017101323 B4 | 6/2018 |

(Continued)

OTHER PUBLICATIONS

PCT Search Report, International Application No. PCT/US2023/080054, Feb. 16, 2024, 3 pages.

(Continued)

*Primary Examiner* — Jigneshkumar C Patel

(74) *Attorney, Agent, or Firm* — McDermott Will & Emery

(57) ABSTRACT

Managing temperature control of a heating element of an outdoor furniture piece, including identifying telemetry data associated with sensors of the outdoor furniture piece; receiving external data associated with environmental conditions of the outdoor furniture piece based on a geographic location of the outdoor furniture piece; training, based on the telemetry data and the external data, the temperature control management model, including generating a thermal policy including configuration rules, the configuration rules for automatically adjusting electrical energy output by a power source in communication with the heating element; monitoring the telemetry data associated with the sensors and the environmental conditions of the outdoor furniture piece; in response, i) accessing the temperature control management model including the thermal policy, ii) identifying configuration rules based on the monitored telemetry data and environmental conditions, and iii) applying configuration rules to perform adjustment of the electrical energy output by the power source.

20 Claims, 14 Drawing Sheets

(56) References Cited

U.S. PATENT DOCUMENTS

| | | | |
|---|---|---|---|
| 2014/0217785 A1* | 8/2014 | Arens | A47C 7/744 297/180.12 |
| 2017/0013965 A1 | 1/2017 | Schurink et al. | |
| 2017/0143122 A1 | 5/2017 | Nelson et al. | |
| 2017/0245325 A1 | 8/2017 | Fee et al. | |
| 2018/0325265 A1* | 11/2018 | Warner | A47C 7/18 |
| 2020/0037768 A1 | 2/2020 | Gober | |
| 2022/0175145 A1 | 6/2022 | Pomeroy et al. | |
| 2022/0194264 A1 | 6/2022 | Kaku et al. | |
| 2022/0211188 A1 | 7/2022 | Daub et al. | |
| 2024/0041210 A1 | 2/2024 | Dukart | |
| 2024/0172874 A1 | 5/2024 | Long et al. | |

FOREIGN PATENT DOCUMENTS

| | | |
|---|---|---|
| CA | 3141037 A1 | 6/2022 |
| CN | 108618442 A | 10/2018 |
| CN | 109124145 A | 1/2019 |
| CN | 112493922 A | 3/2021 |
| CN | 114359524 A | 4/2022 |
| CN | 217827295 U | 11/2022 |
| DE | 202010005295 U1 | 9/2010 |
| IN | 201911028401 A | 8/2021 |
| IN | 202211010724 A | 3/2022 |
| JP | 2002065630 A | 3/2002 |
| KR | 101671147 B1 | 11/2016 |
| KR | 102035420 B1 | 10/2019 |
| KR | 102059097 B1 | 12/2019 |
| KR | 102086623 B1 | 3/2020 |
| KR | 20200032476 A | 3/2020 |
| KR | 102109946 B1 | 5/2020 |
| KR | 20210027684 A | 3/2021 |
| KR | 20220048157 A | 4/2022 |
| KR | 10-2022-0116902 A | 8/2022 |
| WO | 2019054648 A1 | 3/2019 |
| WO | 2021097432 A1 | 5/2021 |

OTHER PUBLICATIONS

PCT Written Opinion, International Application No. PCT/US2023/080054, Feb. 16, 2024, 6 pages.

PCT Search Report, International Application No. PCT/US2023/080056, Feb. 23, 2024, 3 pages.

PCT Written Opinion, International Application No. PCT/US2023/080056, Feb. 23, 2024, 4 pages.

* cited by examiner ns of the outdoor furniture piece; and training, based on the telemetry data and the external data, the temperature control management model, including generating a thermal policy including configuration rules, the configuration rules for automatically adjusting electrical energy output by a power source in communication with the heating element; performing, at a second time, a steady-state management of the temperature control of the heating element of the outdoor furniture piece, including: monitoring the telemetry data associated with the sensors of the outdoor furniture piece; monitoring the environmental conditions of the outdoor furniture piece; and in response to monitoring the sensors and the environmental conditions, i) accessing the temperature control management model including the thermal policy, ii) identifying one or more of the configuration rules based on the monitored telemetry data and the monitored environmental conditions, and iii) applying the one or more configuration rules to perform adjustment of the electrical energy output by the power source.

MANAGING TEMPERATURE CONTROL OF A HEATING ELEMENT OF AN OUTDOOR FURNITURE PIECE

BACKGROUND

Field of the Disclosure

The disclosure relates generally to an outdoor furniture piece with temperature control.

SUMMARY

Innovative aspects of the subject matter described in this specification may be embodied in an outdoor furniture piece, including: a plurality of members coupled together to form a structure of the outdoor furniture piece; a cushion positioned adjacent to one or more first members of the plurality of members of the structure; a heating element coupled to the cushion; and a power source coupled to a second member of the plurality of members, the power source in electrical communication with the heating element such that the power source provides electrical energy to the heating element, wherein when the heating element receives the electrical energy from the power source, the heating element converts the electrical energy to thermal energy at the cushion.

Other embodiments of these aspects include corresponding systems and apparatus.

These and other embodiments may each optionally include one or more of the following features. For instance, the second member is one of the first members. The second member is distinct from the first members. The power source is a rechargeable battery. The power source further includes an input power source outlet to receive input power to charge the rechargeable battery. The power source is removably coupled to the second member. A bracket coupled to the second member, wherein the power source is removably coupled to the bracket. The power source further includes first magnetic coupling members and the bracket includes second magnetic coupling members, wherein when the power source is coupled to the bracket, the first magnetic coupling members are coupled to the second magnetic coupling members such that the power source provides the electrical energy from the first magnetic coupling members to the second magnetic coupling members. The bracket further includes third magnetic coupling members that are in electrical communication with the second magnetic coupling members such that the electrical energy provided by the power source is transmitted through the second magnetic coupling members to the third magnetic coupling members. The heating element further includes fourth magnetic coupling members, wherein when the heating element is in electrical communication with the power source, the third magnetic coupling members are coupled to the fourth magnetic coupling members such that electrical energy provided by the power source is transmitted through the third magnetic coupling members to the fourth magnetic coupling members. When the heating element is in electrical communication with the power source, the electrical energy provided by the power source is transmitted through the fourth magnetic coupling members to wiring of the heating element to convert the electrical energy to thermal energy at the cushion. Further including an additional cushion positioned adjacent to one or more third members of the plurality of members of the structure; and an additional heating element coupled to the additional cushion, wherein the additional heating element is in electrical communication with the heating element such that the additional heating element receives the electrical energy from the power source through the heating element, the additional heating element converting the electrical energy to thermal energy at the additional cushion. The heating element includes fifth magnetic coupling members that are in electrical communication with the wiring of the heating element such that electrical energy provided by the power source is transmitted through the wiring to the fifth magnetic coupling members. The additional heating element includes sixth magnetic coupling members, wherein when the additional heating element is in electrical communication with the heating element, the sixth magnetic coupling members are coupled to the fifth magnetic coupling members such that electrical energy provided by the power source is transmitted through the fifth magnetic coupling members to the sixth magnetic coupling members. When the additional heating element is in electrical communication with the power source, the electrical energy provided by the power source is transmitted through the sixth magnetic coupling members to additional wiring of the additional heating element to convert the electrical energy to thermal energy at the additional cushion. The structure of the outdoor furniture piece is a chair. Further including a microcontroller in communication with the power source, the microcontroller controlling the electrical energy provided by the power source; and a physical button in communication with the microcontroller, wherein, in response to user input at the physical button, the microcontroller is configured to adjust the electrical energy output by the power source.

Innovative aspects of the subject matter described in this specification may be embodied in a method of managing temperature control of a heating element of an outdoor furniture piece, including performing, at a first time, a calibration and configuration of a temperature control management model, including: identifying telemetry data associated with one or more sensors of the outdoor furniture piece; receiving external data associated with environmental conditio Other embodiments of these aspects include corresponding systems, apparatus, and computer programs, configured to perform the actions of the methods, encoded on computer storage devices.

These and other embodiments may each optionally include one or more of the following features. For instance, applying the one or more configuration rules to perform adjustment of the electrical energy output by the power source adjusts a temperature of the heating element. Identifying the telemetry data associated with one or more sensors of the outdoor furniture piece further includes identifying ambient conditions associated with an environment of the outdoor furniture piece, the ambient conditions including i) a temperature of the environment proximate to the outdoor furniture piece, ii) a humidity of the environment proximate to the outdoor furniture piece, and iii) a pressure of the environment proximate to the outdoor furniture piece. Identifying the telemetry data associated with one or more sensors of the outdoor furniture piece further includes identifying conditions at the outdoor furniture piece, including i) a temperature at a cushion of the outdoor furniture piece, ii) a moisture at the cushion of the outdoor furniture piece, iii) and an occupancy of a user at the cushion of the outdoor furniture piece. Performing the calibration and configuration of the temperature control management model further includes identifying a first time period for which a particular sensor of the one or more sensors indicates the occupancy of the user, and performing the steady-state management of the temperature control of the heating element of the outdoor furniture piece further includes monitoring a second time period for which the particular sensor indicates the occupancy of the user. The first time period includes a time of day and a day of week, and the second time period includes a time of day and a day of week. The power source is a rechargeable battery, and wherein identifying the telemetry data associated with one or more sensors of the outdoor furniture piece further includes identifying i) a voltage of the electrical energy output by the rechargeable battery, ii) a current capacity of the rechargeable battery, and iii) a health of the rechargeable battery. In the external data associated with environmental conditions of the outdoor furniture piece includes i) a temperature forecast for the geographic location of the outdoor furniture piece, ii) a wind forecast for the geographic location of the outdoor furniture piece, iii) historical weather data for the geographic location of the outdoor furniture piece, and iv) precipitation trends for the geographic location of the outdoor furniture piece. Performing the calibration and configuration of the temperature control management model is performed multiple times prior to performing the steady-state management of the temperature control of the heating element of the outdoor furniture piece.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses an outdoor furniture piece with temperature control. In short, an outdoor furniture piece can include a heating element coupled to a cushion. The heating element can be coupled to a power source. The heating element can receive electrical energy from the power source, and convert such to thermal energy at the cushion. Additionally, the temperature control of the heating element can be managed based on recommendations determined from, among other data points, sensor data and historical usage.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
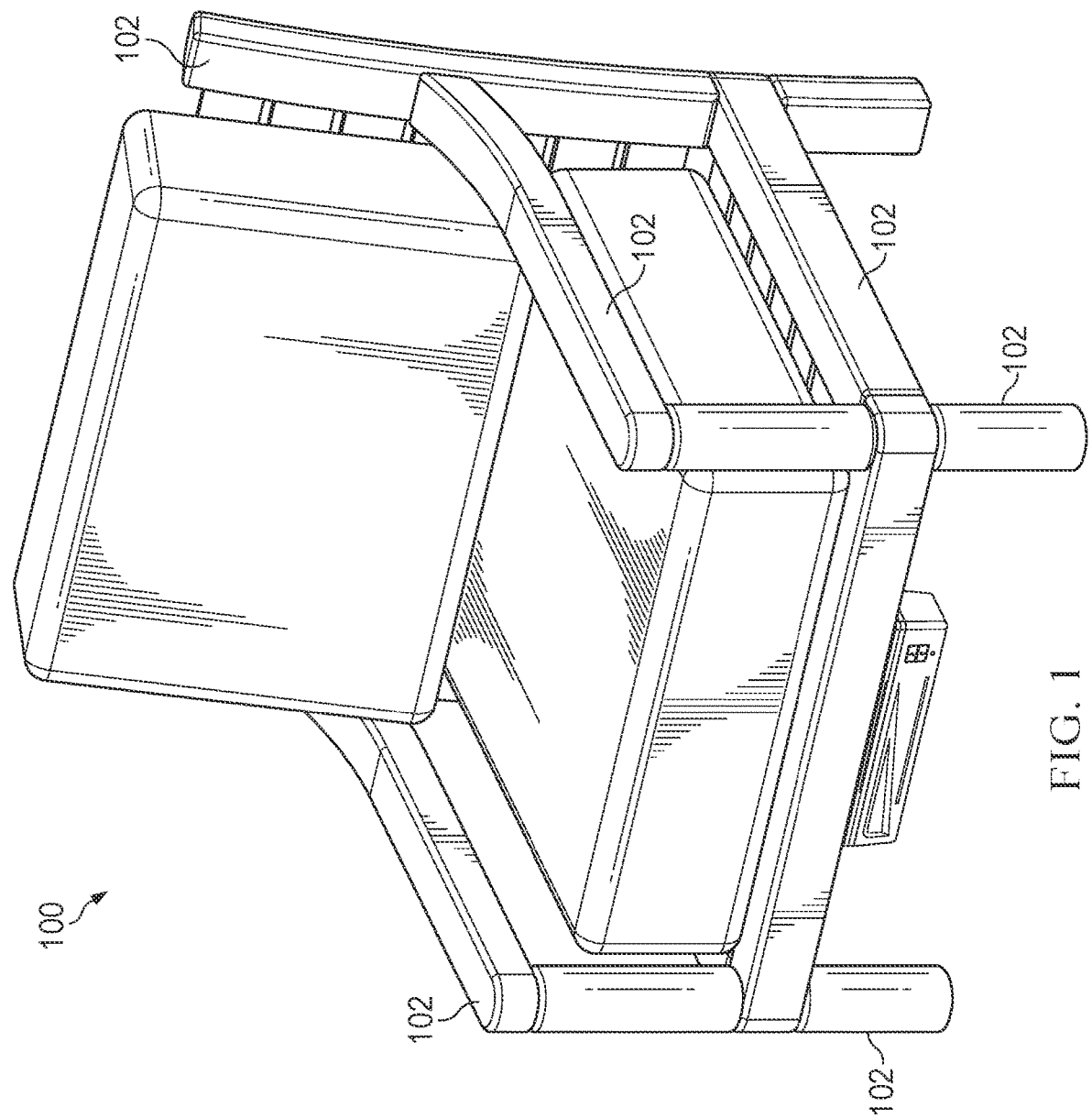
FIGS. 1 and 2 illustrate a perspective view of an outdoor furniture piece.

FIG. 1 illustrates a perspective view of an outdoor furniture piece 100. The outdoor furniture piece 100 can include a plurality of members 102 coupled together to form a structure of the furniture piece 100. For ease of illustration, only a portion of the members 102 are specifically referenced by FIG. 1. In some examples, the outdoor furniture piece 100 can include a chair, couch, or any seated type of furniture. In some examples, the outdoor furniture piece 100 can include any type of furniture. In some examples, the outdoor furniture piece 100 is formed of one or more combinations of wood, metal (e.g., aluminum), plastic, or any composite materials. In some examples, at least one or more of the members 102 of the outdoor furniture piece 100 is hollow. In some examples, at least one or more of the members 102 of the outdoor furniture piece 100 is solid.

Figure 2:
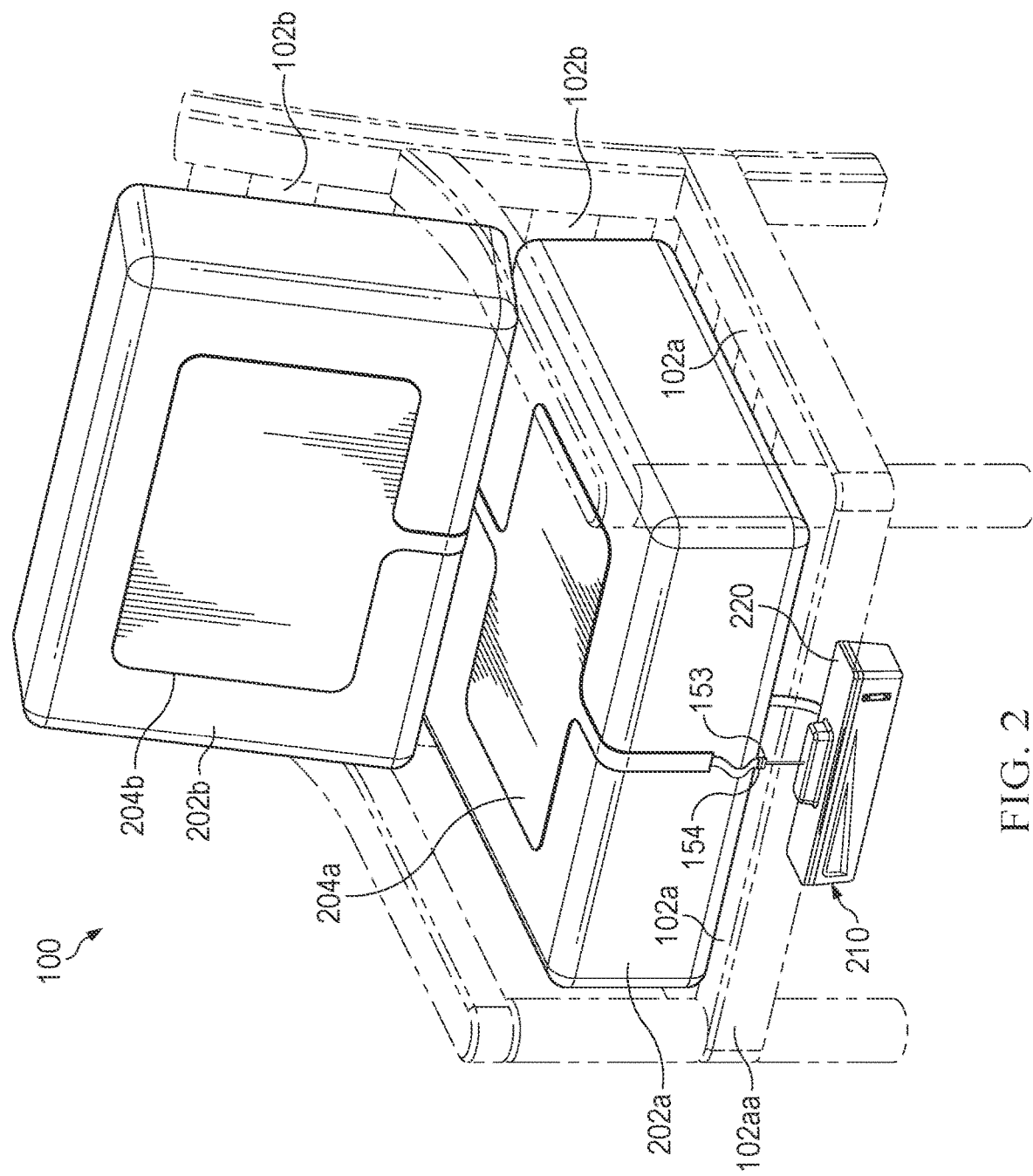

FIG. 2 illustrates a perspective view of the outdoor furniture piece 100. Referring to FIGS. 1 and 2, the outdoor furniture piece 100 includes a first cushion 202a and a second cushion 202b (collectively referred to as cushions 202). The cushions 202 can be formed from any type of appropriate material such as foam, and covered with any type of appropriate material, such as fabric, vinyl, and/or plastic. The first cushion 202a can be positioned adjacent to a first set of the members 102, illustrated as members 102a. For example, when the outdoor furniture piece 100 is a chair, the first cushion 202a can generally be referred to as a "seat" of the chair. The second cushion 202b can be positioned adjacent to a second set of the members 102, illustrated as members 102b. For example, when the outdoor furniture piece 100 is a chair, the second cushion 202b can generally be referred to as a "back" of the chair.

The outdoor furniture piece 100 can further include a first heating element 204a and a second heating element 204b (collectively referred to as heating elements 204). The heating elements 204 can be any form of a localized heating source, such as a heating pad. The first heating element 204a can be coupled to the first cushion 202a. In some examples, the first heating element 204a is formed within the first cushion 202a—a part of the body (foam) of the first cushion 202a or a part of the cover of the first cushion 202a. In some examples, the first heating element 204a is formed between the body (foam) of the first cushion 202a and the cover of the first cushion 202a. The second heating element 204b can be coupled to the second cushion 202b. In some examples, the second heating element 204b is formed within the second cushion 202b—a part of the body (foam) of the second cushion 202b or a part of the cover of the second cushion 202b. In some examples, the second heating element 204b is formed between the body (foam) of the second cushion 202b and the cover of the second cushion 202b.

Figure 3:
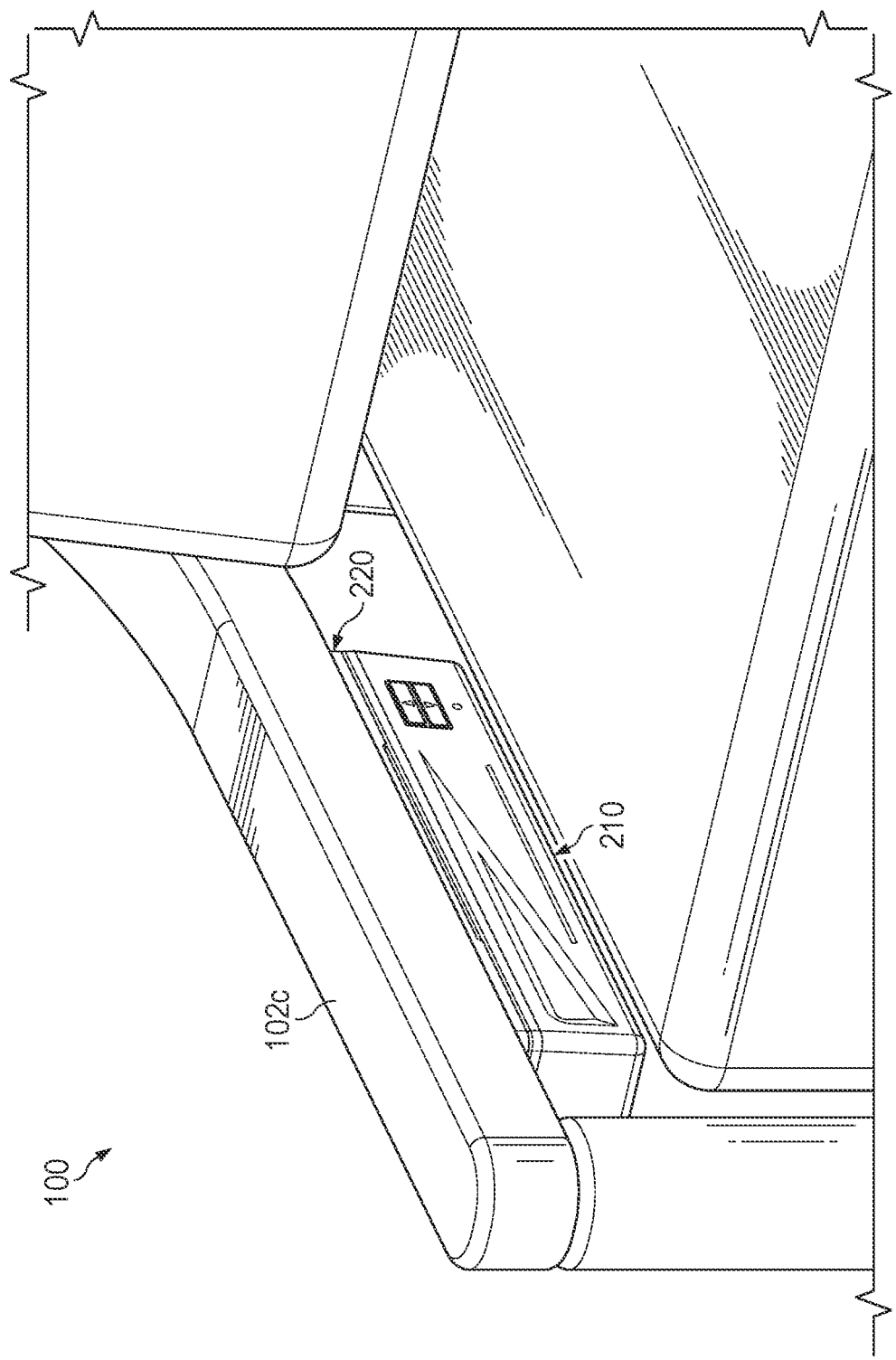
FIG. 3 illustrates a control unit coupled to a member of the outdoor furniture piece.

The outdoor furniture piece 100 can further include a control unit 210. The control unit 210 can be coupled to any member 102 (or members 102) of the outdoor furniture piece 100. In some examples, as illustrated in FIG. 2, the control unit 210 is coupled to one of the members 102a, illustrated as member 102aa (e.g., a front seat member). In some examples, as illustrated in FIG. 3, the control unit 210 is coupled to a member 102c of the members 102 (e.g., an arm rest member). The location of the control unit 210 with respect to coupling with the outdoor furniture piece 100 can be location agnostic. In some examples, the control unit 210 is partially or fully integrated with one or more members 102 of the outdoor furniture piece 100. In some examples, when the control unit 210 is partially or fully integrated with one or more members 102 of the outdoor furniture piece 100, the corresponding members 102 can include one or more holes to access one or more interactable elements of the control unit 210. In some examples, when the control unit 210 is partially or fully integrated with one or more members 102 of the outdoor furniture piece 100, the control unit 210 can include a detachable panel for access to the control unit 210 coupled to the corresponding member 102 (e.g., for access to internal components to the control unit 210).

Figure 4:
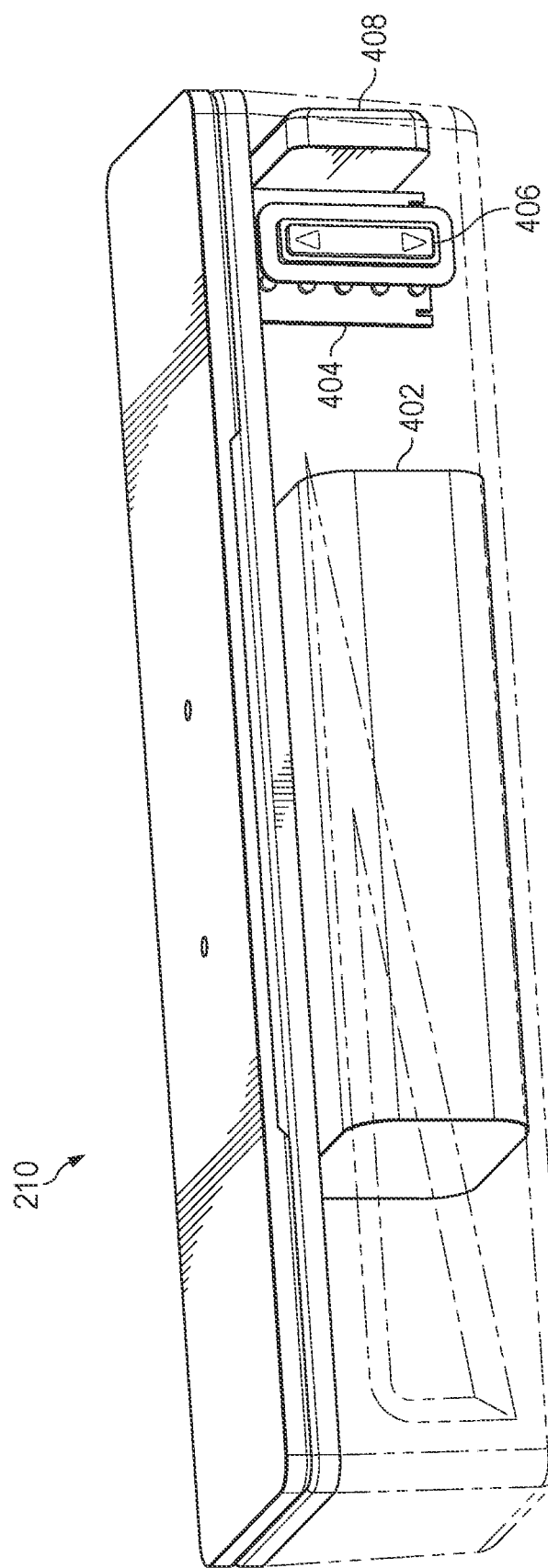
FIG. 4 illustrates a partially transparent view of the control unit.

FIG. 4 illustrates a partially transparent view of the control unit 210. The control unit 210 can include a power source 402, a microcontroller 404, a physical button (interface) 406, and an outlet interface 408

Referring back to FIGS. 2 and 3, the outdoor furniture piece 100 can further include a bracket 220. The bracket 220 can be coupled to any member 102 (or members 102) of the outdoor furniture piece 100. For example, as illustrated in FIG. 2, the bracket 220 is coupled to member 102aa (e.g., the front seat member). For example, as illustrated in FIG. 3, the bracket 220 is coupled to the member 102c (e.g., the arm rest member). The bracket 220 can be coupled to the member 102 by any means, such as by fasteners, or adhesive. In some examples, the member 102 can include a recession (not shown) that the bracket 220 is positioned within for coupling with the member 102.

Figure 5:
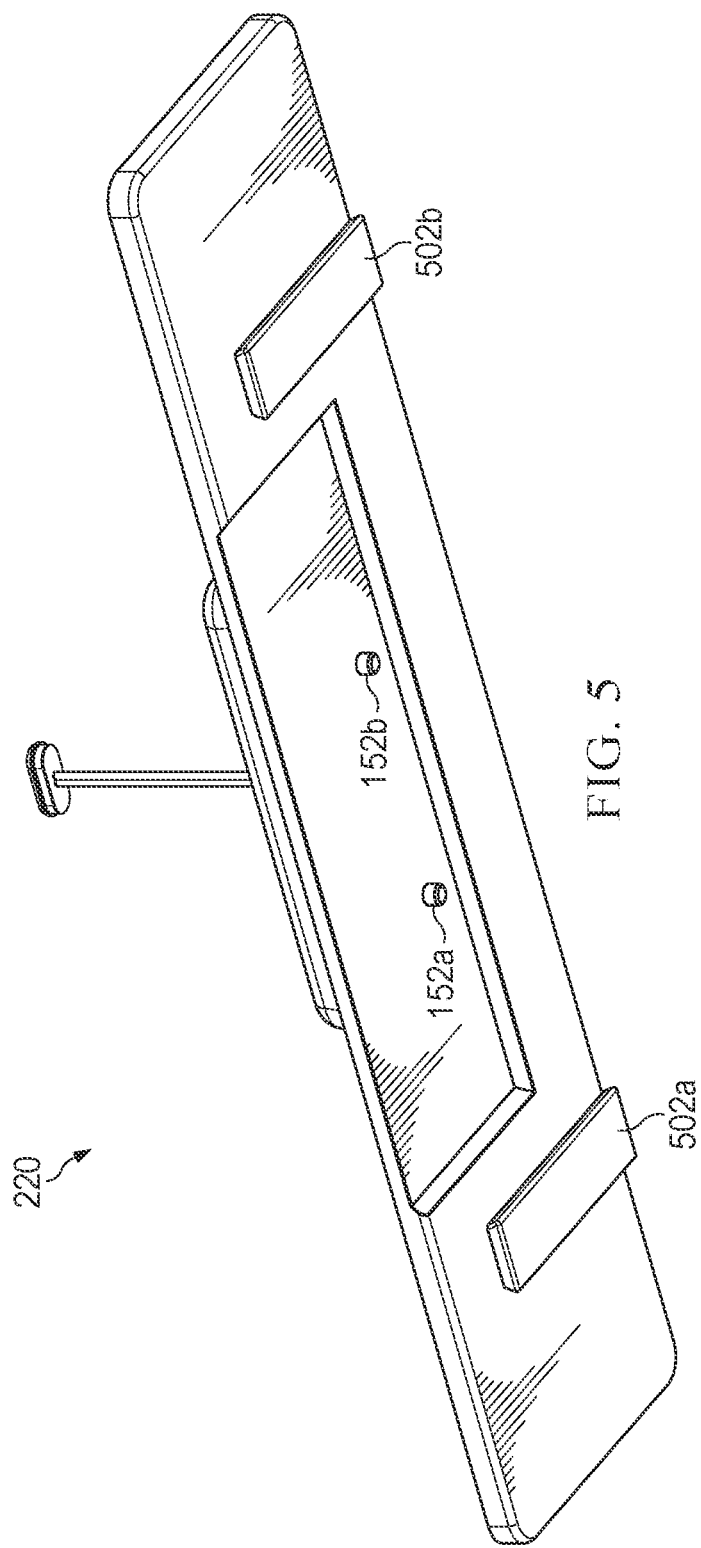
FIG. 5 illustrates a bottom up perspective view of a bracket of the outdoor furniture piece.
Figure 6:
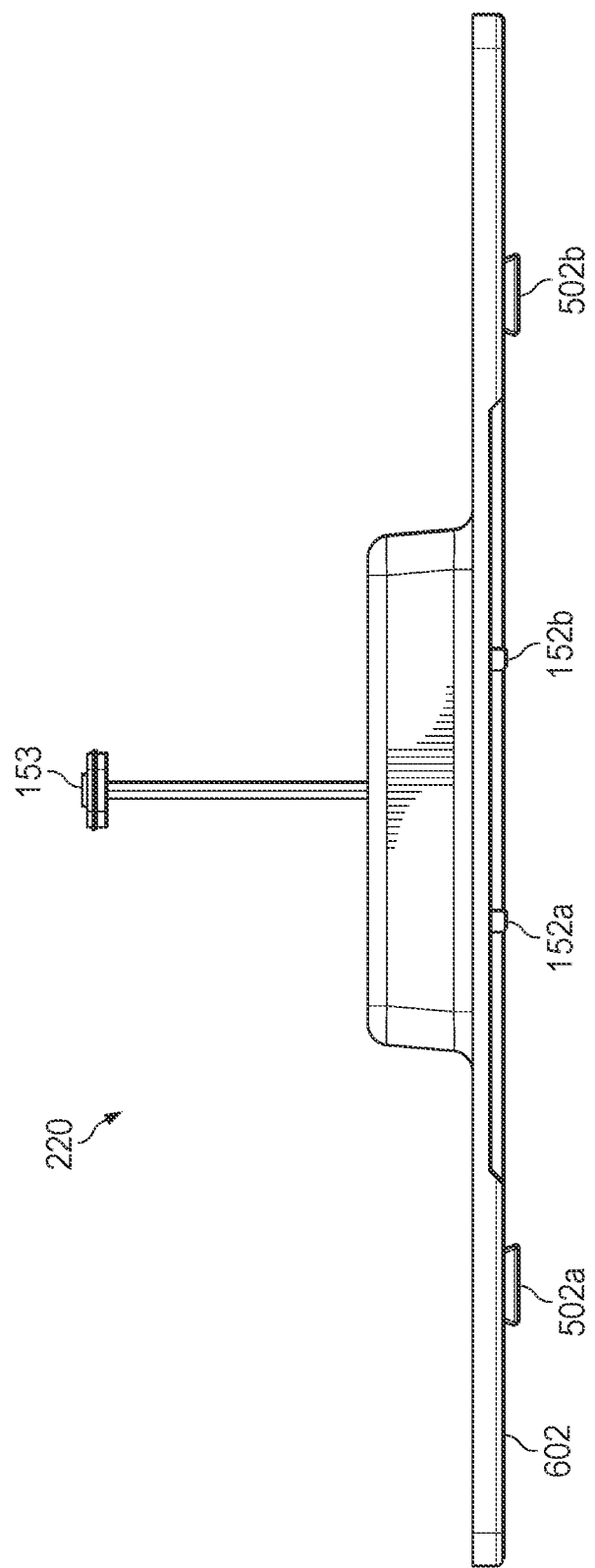
FIG. 6 illustrates a front view of the bracket.

FIG. 5 illustrates a bottom up perspective view of the bracket 220; and FIG. 6 illustrates a front view of the bracket 220. Referring to FIGS. 5 and 6, the control unit 210, and in particular, the power source 402 (shown in FIG. 4), are removably coupled to the bracket 220 (and thus, removably coupled to a member 102 that the bracket 220 is coupled to).

Figure 7:
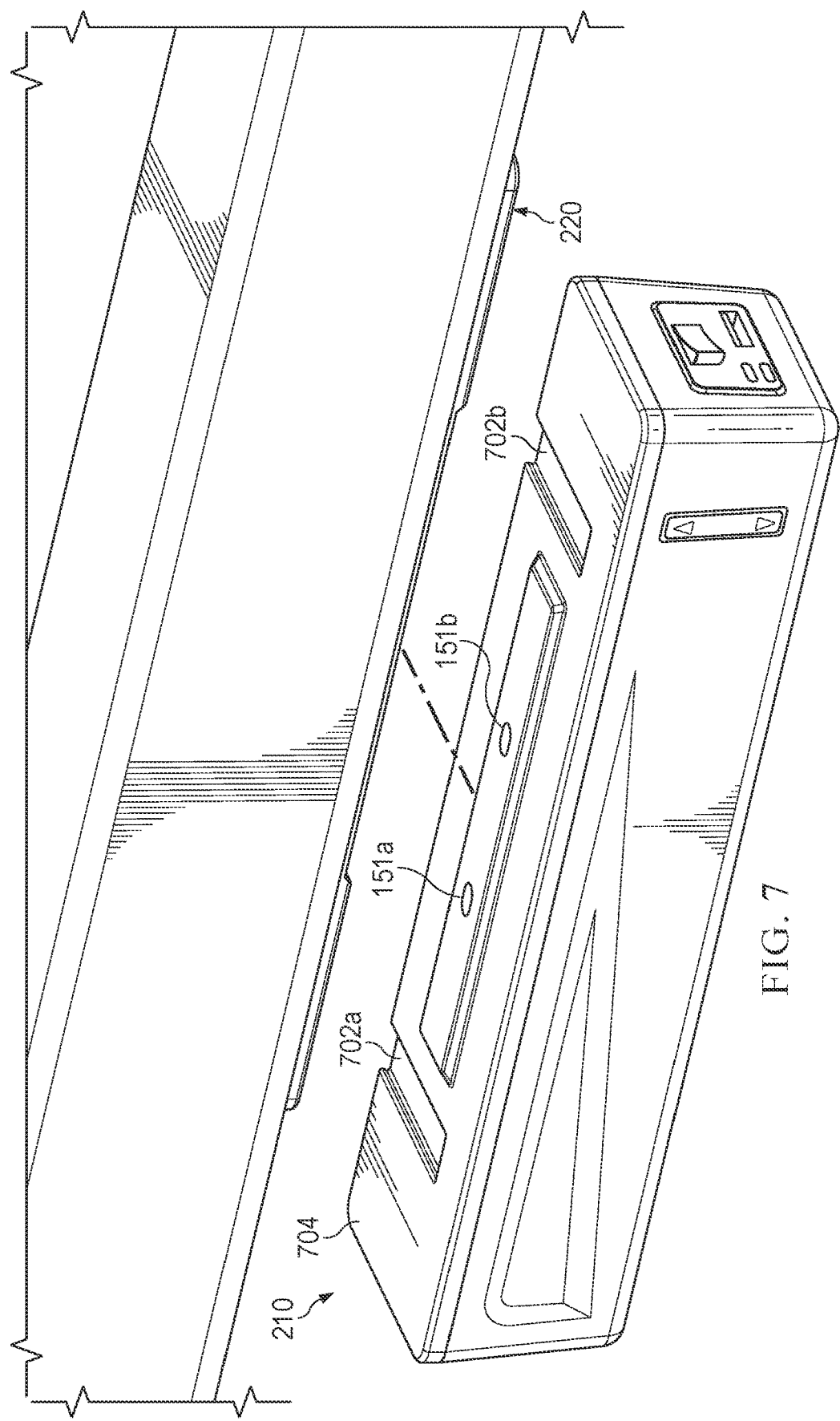
FIG. 7 illustrates a perspective view of the control unit.

For example, the bracket 220 can include protrusions 502a, 502b (collectively referred to as protrusions 502) extending from a surface 602. Each of the protrusions 502 can form a trapezoidal shape. The bracket 220 can include any number of protrusions 502. Further, as shown in FIG. 7, the control unit 210 includes recessions 702a, 702b (collectively referred to as recessions 702) on a surface 704 of the control unit 210. The recessions 702 can have a corresponding trapezoidal shape. To that end, when the control unit 210 is coupled to the bracket 220, the control unit 210 can be "slid" onto the bracket 220 such that the protrusions 502 are positioned within corresponding recessions 702. The corresponding shapes of the protrusions 502 and the recessions 702 can "hold" the coupling of the control unit 210 to the bracket 220 (e.g., against gravity).

Figure 8:
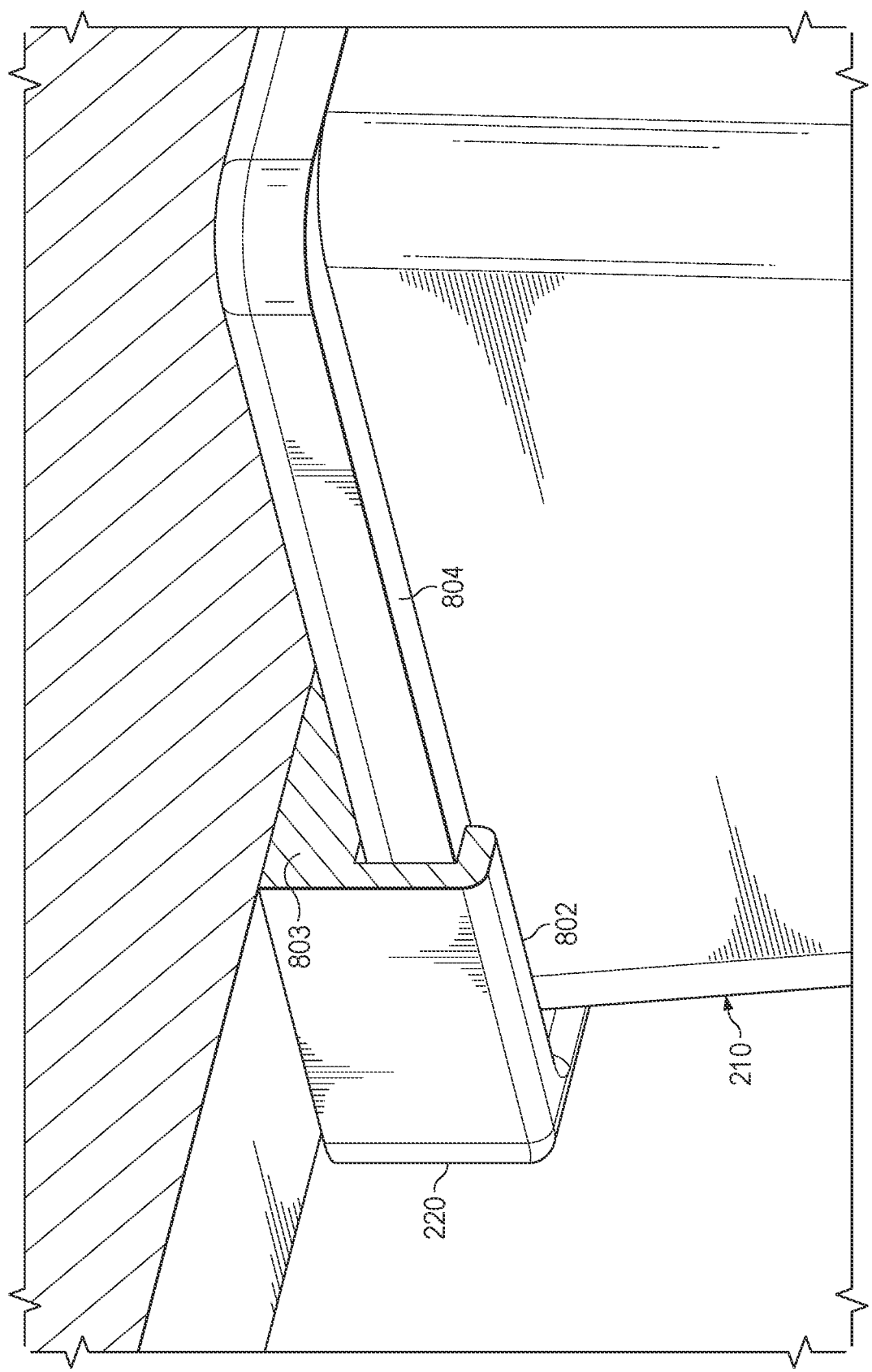
FIGS. 8 and 9 illustrate the control unit coupled to the bracket.
Figure 9:
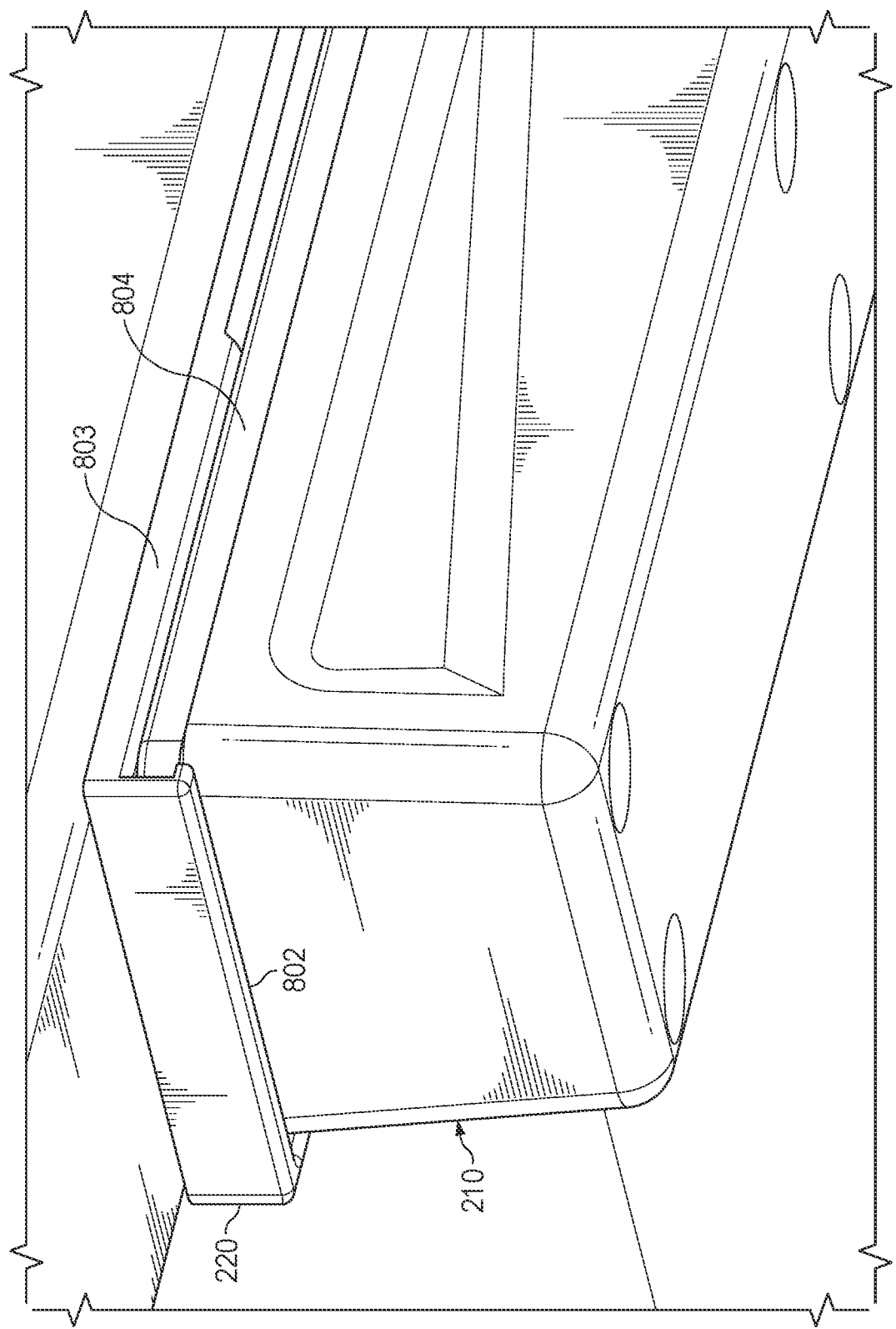

For example, referring to FIGS. 8 and 9, the bracket 220 can include a holding lip 802 extending from a body 803 of the bracket 220 on at least a portion of the perimeter of the bracket 220. Further, the control unit 210 includes a protruding portion 804. To that end, when the control unit 210 is coupled to the bracket 220, the control unit 210 can be "slid" onto the bracket 220 such that the protruding portion 804 is positioned within the lip 802 (e.g., between the body 803 and the lip 802). The lip 802 can "hold" the coupling of the control unit 210 to the bracket 220 (e.g., against gravity).

Referring back to FIG. 4, the power source 402 can be a rechargeable battery. For example, the power source 402 can be an integrated lithium rechargeable battery.

Figure 10:
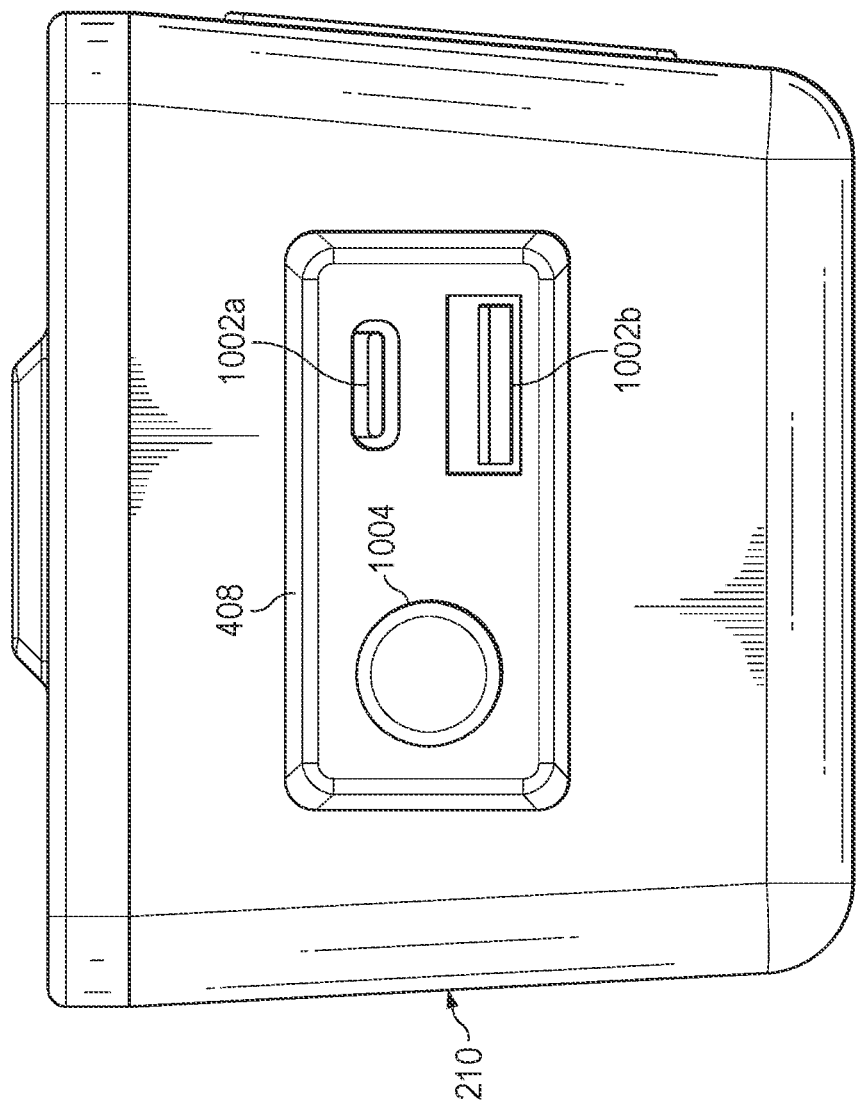
FIG. 10 illustrates a side view of the control unit.

FIG. 10 illustrates a side view of the control unit 210, and in particular the outlet interface 408. The control unit 210 can include outlets 1002a, 1002b and a power state button 1004. However, the control unit 210 can include any number of outlets. As illustrated, the outlet 1002a is a USB-C outlet, and the outlet 1002b is a USB-A outlet; however, the outlets 1002a, 1002b can be any type of charging outlet. In some cases, the outlets 1002a, 1002b can be power out outlets. In some cases, the outlets 1002a, 1002b can be power in outlets. To that end, when the power source 402 is a rechargeable battery, the battery can be recharged when an AC source (not shown) is coupled to one of the outlets 1002a, 100b. In some cases, the control unit 210 can be powered by the power source 402 and/or an AC source when coupled to one of the outlets 1002a, 1002b (e.g., the control unit 210 is "plugged in"). That is, the AC source, when coupled to one of the outlets 1002a, 1002b, can i) provide energy to the recharge battery (the power source 402), and ii) provide energy to power the control unit 210 (and in particular, the microcontroller 404). In some cases, the rechargeable battery provides energy to power the control unit 210 (and in particular, the microcontroller 404) independent of any AC source or in coordination with the AC power source.

The power state button 1004 can control a power state of the control unit 210. That is, a user can interact with the power state button 1004 to adjust the power state of the control unit 210 between an off-power state and an on-power state. In some cases, a light surrounds the power state button (e.g., LED light) to visually indicate the power state of the control unit 210.

Referring back to FIGS. 2 and 4, the control unit 210, and in particular, the power source 402, is in electrical communication with one or more of the heating elements 204 such that the power source 402 provides electrical energy to the one or more heating elements 204, described further herein.

Referring to FIG. 4, the microcontroller 404 is in communication with the power source 402, and in particular, in communication with the power source 402 to control (or manage) the electrical energy that is output by the power source 402. Further, the physical button (interface) 406 can be in communication with the microcontroller 404. In some examples, the microcontroller 404 adjusts the electrical energy output by the power source 402 in response to user input at the physical button 406. For example, a user can provide input at the physical button 406 indicating a desired temperature setting. The microcontroller 404 can receive data from the physical button 406 indicating the desired temperature setting, and in response, provide control signals to the power source 402 to adjust the electrical anergy output by the power source 402 to correspond to the desired temperature setting. For example, the physical button 406 can include "up" and "down" buttons for adjusting the temperature setting up or down. For example, the physical button 406 can include a scroll wheel for adjusting the temperature setting up or down. For example, the physical button 406 can be touch sensitive for adjusting the temperature setting up or down.

In some examples, the microcontroller 404 adjusts the electrical energy output by the power source 402 in response to user input provided at a separate computing device and received wireless over a communication channel. For example, a user can provide input at a portable computing device indicating a desired temperature setting. The microcontroller 404 can receive data from the computing device indicating the desired temperature setting, and in response, provide control signals to the power source 402 to adjust the electrical anergy output by the power source 402 to correspond to the desired temperature setting.

Referring back to FIG. 7, the control unit 210 can include first magnetic coupling members 151a, 151b (collectively referred to as first magnetic coupling members 151). However, the control unit 210 can include any number of first magnetic coupling members 151. The power source 402 can provide the electrical energy to the first magnetic coupling members 151. Referring back to FIGS. 5 and 6, the bracket 220 includes second magnetic coupling members 152a, 152b (collectively referring to as second magnetic coupling members 152). However, the bracket 220 can include any number of second magnetic coupling members 152 (e.g., corresponding to the number of first magnetic coupling members 151).

To that end, when the control unit 210 (and the power source 402) is coupled to the bracket 220 (as shown in FIGS. 1 and 2), the first magnetic coupling members 151 of the control unit 210 are coupled to (in contact with) the second magnetic coupling members 152 of the bracket 220. When the first magnetic coupling members 151 are coupled to (in contact with) the second magnetic coupling members 152, the power source 402 provides the electrical energy from the first magnetic coupling members 151 to the second magnetic coupling members 152.

Referring back to FIG. 6, the bracket 220 can further include a third magnetic coupling member 153. However, the bracket 220 can include any number of third magnetic coupling members 153. The third magnetic coupling member 153 is in electrical communication with the second magnetic coupling 152. When the second magnetic coupling members 152 are in electrical communication with the third magnetic coupling members 153, the electrical energy provided by the power source 402 is transmitted through the second magnetic coupling members 152 to the third magnetic coupling member 153.

Referring back to FIG. 2, the first heating element 204a includes a fourth magnetic coupling members 154. However, the first heating element 204a can include any number of fourth magnetic coupling members 154. To that end, when first heating element 204a is in electrical communication with the power source 402, the third magnetic coupling member 153 of the bracket 220 is coupled to (in contact with) the fourth magnetic coupling member 154 of the first heating element 204a. When the third magnetic coupling member 153 is coupled to (in contact with) the fourth magnetic coupling member 154, the electrical energy provided by the power source 402 is transmitted through the third magnetic coupling member 153 to the fourth magnetic coupling member 154.

To that end, when the first heating element 204a receives the electrical energy from the power source 402, the first heating element 204a converts the electrical energy to thermal energy at the first cushion 202a. That is, end, when first heating element 204a is in electrical communication with the power source 402, the electrical energy provided by the power source 402 is transmitted through the fourth magnetic coupling member 154 to wiring of the first heating element 204a to convert the electrical energy to thermal energy at the first cushion 202a. Specifically, the first heating element 204a receives the electrical energy from the power source 402 through the first magnetic coupling members 151 to the second magnetic coupling members 152 to the third magnetic coupling member 153 to the fourth magnetic coupling member 154. The first heating element 204a coverts the received electrical energy to thermal energy such that a temperature of the first cushion 202a (or at the first cushion 202a or proximate to the first cushion 202a) is adjusted (e.g., based on the user input at the physical button 406 of the control unit 210).

Figure 11:
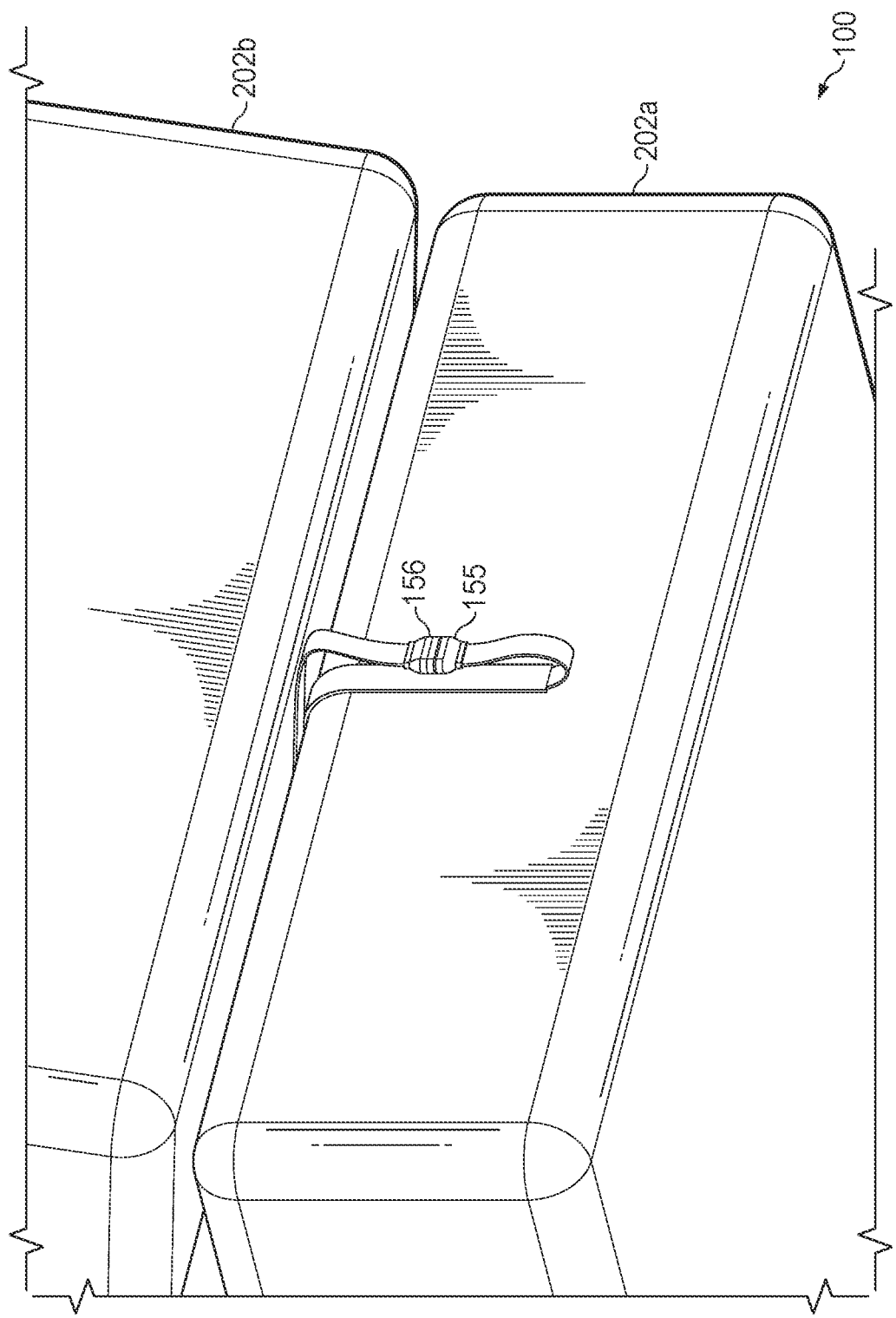
FIG. 11 illustrates a back view of the outdoor furniture piece.

FIG. 11 illustrates a back view of the outdoor furniture piece 100. The first heating element 204a includes a fifth magnetic coupling member 155. However, the first heating element 204a can include any number of fifth magnetic coupling member 155. The fifth magnetic coupling member 155 is in electrical communication with the wiring of the first heating element 204a such that electrical energy provided by the power source 402 is transmitted through the writing of the first heating element 204a to the fifth magnetic coupling member 155.

Referring to FIGS. 2 and 11, the second heating element 204b includes a sixth magnetic couple member 156. However, the second heating element 204b can include any number of sixth magnetic coupling members 156. To that end, when the second heating element 204b is in electoral communication with the first heating element 204a, the sixth magnetic coupling member 156 of the second heating element 204b is coupled to (in contact with) the fifth magnetic coupling member 155 of the first heating element 204a. When the sixth magnetic coupling member 156 is coupled to (in contact with) the fifth magnetic coupling member 155, the electrical energy provided by the power source 402 is transmitted through the fifth magnetic coupling member 155 to the sixth magnetic coupling member 156. To that end, when the second heating element 204b is electrical communication with the first heating element 204a such that the second heating element 204b receives the electrical energy from the power source 402 through the first heating element 204a, the second heating element 204b converts the electrical energy to thermal energy at the second cushion 202b. That is, end, when second heating element 204b is in electrical communication with the power source 402, the electrical energy provided by the power source 402 is transmitted through the sixth magnetic coupling member 156 to wiring of the second heating element 204b to convert the electrical energy to thermal energy at the second cushion 202b. Specifically, the second heating element 204b receives the electrical energy from the power source 402 through the first magnetic coupling members 151 to the second magnetic coupling members 152 to the third magnetic coupling member 153 to the fourth magnetic coupling member 154 to the wiring of the first heating element 204a to the fifth magnetic coupling member 155 to the sixth magnetic coupling member 156. The second heating element 204b coverts the received electrical energy to thermal energy such that a temperature of the second cushion 202b (or at the second cushion 202b or proximate to the second cushion 202b) is adjusted (e.g., based on the user input at the physical button 406 of the control unit 210).

Figure 12:
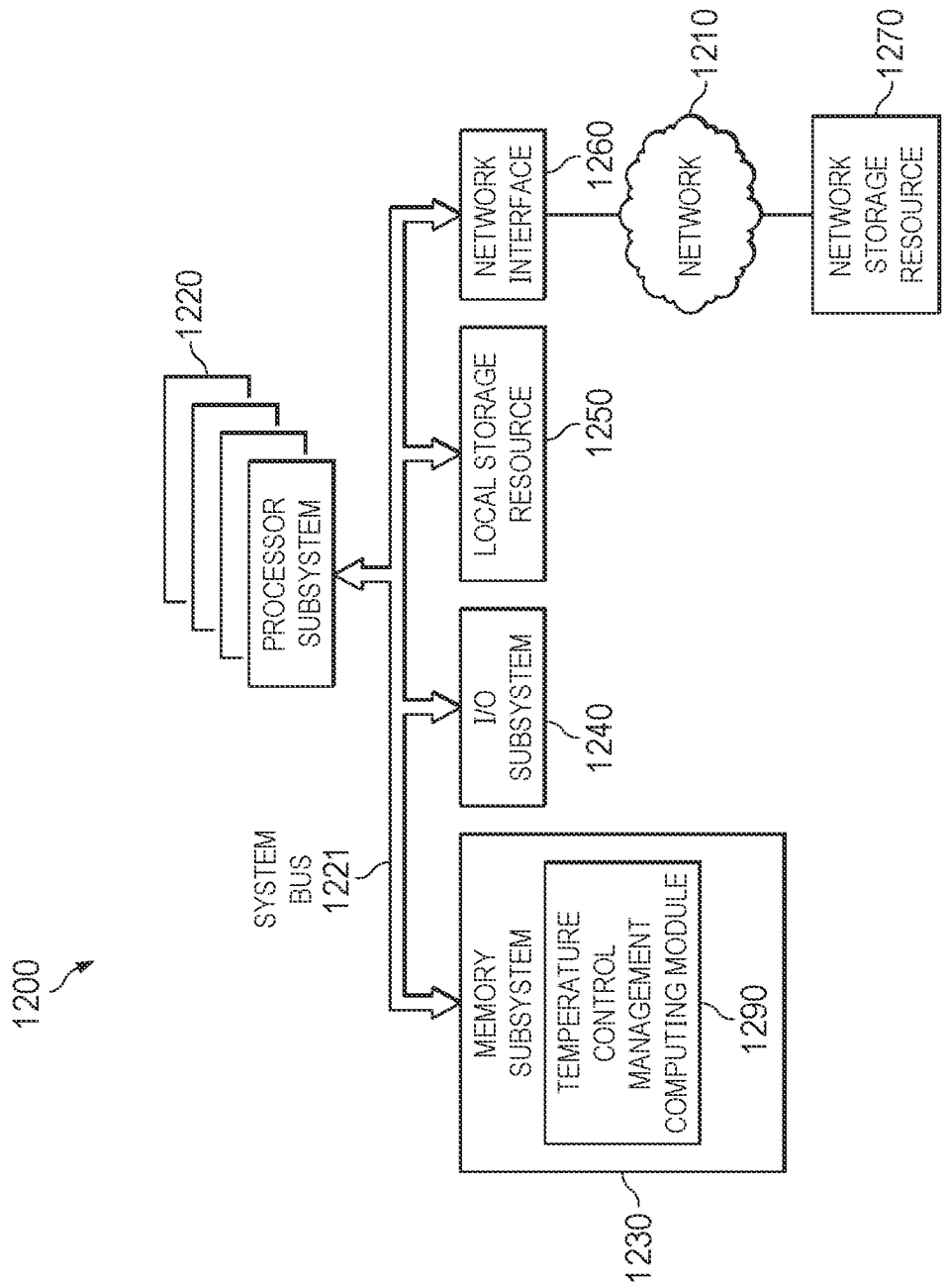
FIG. 12 is a block diagram of selected elements of an embodiment of a computing device.
Figure 13:
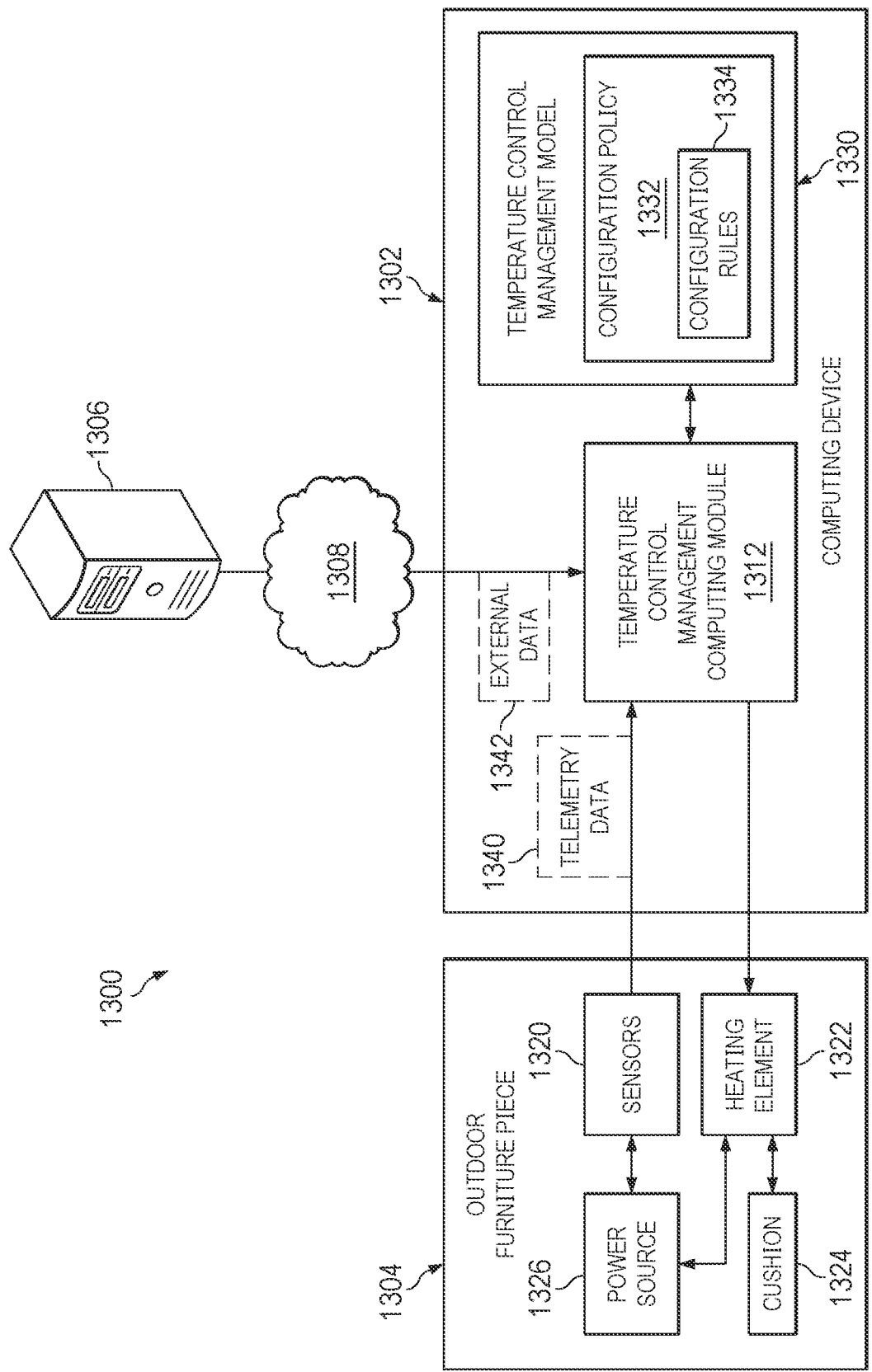
FIG. 13 illustrates a block diagram of a computing environment for managing temperature control of a heating element of an outdoor furniture piece.
Figure 14:
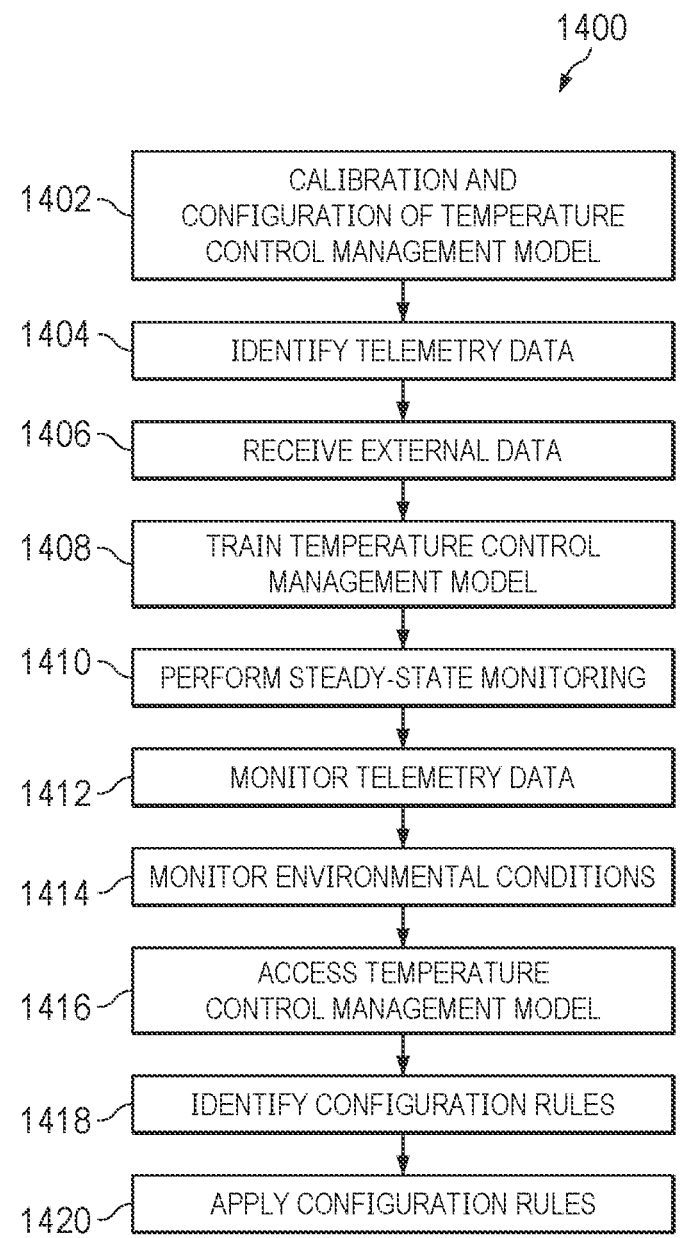
FIG. 14 illustrates a method for managing temperature control of a heating element of the outdoor furniture piece.

FIGS. 12-14 describe managing temperature control of the heating element of the outdoor furniture piece.

For the purposes of this disclosure, a computing device may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, a computing device may be a personal computer, a PDA, a consumer electronic device, a network storage device, or another suitable device and may vary in size, shape, performance, functionality, and price. The computing device may include memory, one or more processing resources such as a central processing unit (CPU) or hardware or software control logic. Additional components of the computing device may include one or more storage devices, one or more communications ports for communicating with external devices as well as various input and output (I/O) devices, such as a keyboard, a mouse, and a video display. The computing device may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 12-14 wherein like numbers are used to indicate like and corresponding parts.

Turning now to the drawings, FIG. 12 illustrates a block diagram depicting selected elements of a computing device 1200 in accordance with some embodiments of the present disclosure. In various embodiments, the computing device 1200 may represent different types of portable computing devices, such as, display devices, head mounted displays, head mount display systems, smart phones, tablet computers, notebook computers, media players, digital cameras, 2-in-1 tablet-laptop combination computers, and wireless organizers, or other types of portable computing devices. In one or more embodiments, computing device 1200 may also represent other types of computing devices, including desktop computers, server systems, controllers, and microcontroller units, among other types of computing devices. Components of computing device 1200 may include, but are not limited to, a processor subsystem 1220, which may comprise one or more processors, and system bus 1221 that communicatively couples various system components to processor subsystem 1220 including, for example, a memory subsystem 1230, an I/O subsystem 1240, a local storage resource 1250, and a network interface 1260. System bus 1221 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 12, processor subsystem 1220 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 1220 may interpret and/or execute program instructions and/or process data stored locally (e.g., in memory subsystem 1230 and/or another component of computing device). In the same or alternative embodiments, processor subsystem 1220 may interpret and/or execute program instructions and/or process data stored remotely (e.g., in network storage resource 1270).

Also in FIG. 12, memory subsystem 1230 may comprise a system, device, or apparatus operable to retain and/or retrieve program instructions and/or data for a period of time (e.g., computer-readable media). Memory subsystem 1230 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated computing device, such as system 1200, is powered down.

In computing device 1200, I/O subsystem 1240 may comprise a system, device, or apparatus generally operable to receive and/or transmit data to/from/within computing device 1200. I/O subsystem 1240 may represent, for example, a variety of communication interfaces, graphics interfaces, video interfaces, user input interfaces, and/or peripheral interfaces. In various embodiments, I/O subsystem 1240 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 1250 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 12, network interface 1260 may be a suitable system, apparatus, or device operable to serve as an interface between computing device 1200 and a network 1210. Network interface 1260 may enable computing device 1220 to communicate over network 1210 using a suitable transmission protocol and/or standard, including, but not limited to, transmission protocols and/or standards enumerated below with respect to the discussion of network 1210. In some embodiments, network interface 160 may be communicatively coupled via network 1210 to a network storage resource 1270. Network 1220 may be a public network or a private (e.g., corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 1260 may enable wired and/or wireless communications (e.g., NFC or Bluetooth) to and/or from computing device 1200.

In particular embodiments, network 1210 may include one or more routers for routing data between client computing devices 1200 and server computing devices 1200. A device (e.g., a client computing device 1200 or a server computing device 1200) on network 1210 may be addressed by a corresponding network address including, for example, an Internet protocol (IP) address, an Internet name, a Windows Internet name service (WINS) name, a domain name or other system name. In particular embodiments, network 1210 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client computing devices 1200 may communicate with one or more server computing devices 1200 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 1210 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (ISCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 1210 and its various components may be implemented using hardware, software, or any combination thereof.

The computing device 1200 can also include a temperature control management computing module 1290. The temperature control management computing module 1290 can be included by the memory subsystem 1230. The temperature control management computing module 1290 can include a computer-executable program (software). The temperature control management computing module 1290 can be executed by the processor subsystem 1220.

Turning to FIG. 13, FIG. 13 illustrates an environment 1300 including a computing device 1302, an outdoor furniture piece 1304, a server computing system 1306, and a network 1308. The computing device 1302 can include a temperature control management computing module 1312. In some examples, the computing device 1302 is similar to, or includes, the computing device 1200 of FIG. 12. In some examples, the server computing system 1306 is similar to, or includes, the computing device 1200 of FIG. 12. In some examples, the temperature control management computing module 1312 is the same, or substantially the same, as the temperature control management computing module 1290 of FIG. 12.

The outdoor furniture piece 1304 can include sensors 1320, a heating element 1322, a cushion 1324, and a power source 1326. The heating element 1322 is in communication with the power source 1326 and coupled to (or coupled at) the cushion 1324. The sensors 1320 are in communication with the power source 1326. In some examples, the outdoor furniture piece 1304 is the same, or substantially the same, as the outdoor furniture piece 100 of FIGS. 1-11. In some examples, the heating element 1322 is the same, or substantially the same, as the heating element 204 of FIGS. 1-11. In some examples, the cushion 1324 is the same, or substantially the same, as the cushion 202 of FIGS. 1-11. In some examples, the power source 1326 is the same as the power source 402 of FIGS. 1-11. In some examples, the power source 1326 is a rechargeable battery.

The computing device 1302 can be in communication with the outdoor furniture piece 1304, and in communication with the server computing system 1306 over the network 1308.

In some examples, the computing device 1302 is integrated within the outdoor furniture piece 1304. In some examples, the computing device 1302 is separate from the outdoor furniture piece 1304. In some examples, the computing device 1302 is a smartphone, a tablet computing device, or a portable computing device.

To that end, the computing device 1302, and in particular, the temperature control management computing module 1312 can manage temperature control of the heating element 1322 of the outdoor furniture piece 1304, described further herein.

In some embodiments, the temperature control management computing module 1312 can perform, at a first time, a calibration and configuration of a temperature control management module model 1330. Specifically, performing of the calibration and the configuration of the temperature control management model 1330 can include identifying telemetry data 1340 associated with the sensors 1320. Specifically, the sensors 1320 can provide the telemetry data 1320 to the computing device 1302, and ultimately, the temperature control management computing module 1312. The sensors 1320 can provide the telemetry data 1340 in response to a request from the computing device 1320, or automatically. In some examples, the sensors 1320 can provide the telemetry data 1340 periodically, e.g., every 1 millisecond, 1 second, 1 minute, 1 hour, 1 day. For example, the sensors 1320 can include an ambient air sensor, a thermostat, an occupancy sensor, and the like.

In some examples, the telemetry data 1340 can include data regarding ambient conditions of an environment proximate to the outdoor furniture piece 1304. For example, the ambient conditions, and the telemetry data, can include i) a temperature of the environment proximate to the outdoor furniture piece 1304; ii) a humidity of the environment proximate to the outdoor furniture piece 1304; and iii) a pressure of the environment proximate to the outdoor furniture piece 1304.

In some examples, the telemetry data 1340 can include data regarding conditions at the outdoor furniture piece 1304. For example, the conditions, and the telemetry data, can include a temperature at the cushion 1324 of the outdoor furniture piece 1304; a moisture at the cushion 1324 of the outdoor furniture piece 1304; and iii) an occupancy of a user at the cushions 1324 of the outdoor furniture piece 1304 (e.g., the user sitting at the outdoor furniture piece 1304).

In some examples, the telemetry data 1340 can include data regarding the power source 1326. For example, the battery conditions, and the telemetry data, can include i) a voltage of electrical energy output by the power source (rechargeable battery) 1326; ii) a current capacity of the power source (rechargeable battery) 1326; and iii) a health of the power source (rechargeable battery) 1326.

In some examples, the temperature control management computing module 1312 can perform, at the first time period, the calibration and configuration of the temperature control management module model 1330 when an occupancy sensor of the sensors 1320 indicates the occupancy of the user (the user sitting at the outdoor furniture piece 1304). That is, the temperature control management computing module 1312 can perform, at the first time period, the calibration and configuration of the temperature control management module model 1330 when the user is "sitting" upon the outdoor furniture piece 1304, and thus, triggering an occupancy sensor of the sensor 1320 to indicate such occupancy of the user. In some examples, the first time period can include a time of day and a day of week.

Performing the calibration and configuration of the temperature control management module model 1330 by the temperature control management computing module 1312 can further include receiving external data 1342 associated with environmental conditions of the outdoor furniture piece 1304 based on a geographic location of the outdoor furniture piece 1304. Specifically, performing the calibration and the configuration of the temperature control management model 1330 can include receiving the external data 1342 from the server computing system 1306 over the network 1308. Specifically, the server computing system 1306 can provide the external data 1342 to the computing device 1302, and ultimately, the temperature control management computing module 1312. The server computing system 1306 can provide the external data 1342 in response to a request from the computing device 1320, or automatically. In some examples, the server computing system 1306 can provide the external data 1342 periodically, e.g., every 1 millisecond, 1 second, 1 minute, 1 hour, 1 day.

To that end, the outdoor furniture piece 1304 can be associated with a particular geographic location. The computing device 1302 can identify the particular geographic location of the outdoor furniture piece 1304 and provide data associated the geographic location to the server computing system 1306. In some examples, the computing device 1302 can identify the geographic location of the outdoor furniture piece 1304 based on a received geographic location from a geographic location sensor of the sensor 1320 from the outdoor furniture piece 1340 (e.g., a "GPS" chip). In some examples, when the computing device 1302 is integrated with the outdoor furniture piece 1304, the computing device 1302 can include a geographic location sensor. In some examples, a user can manually provide the geographic location of the outdoor furniture piece 1304 to the computing device 1302 (e.g., through one or more user-interactable elements of the computing device 1302). In some examples, the geographic location can include longitude/latitude coordinates, zip code, city, state, or other.

The server computing system 1306 can receive the geographic location data associated with the outdoor furniture piece 1304 over the network 1308. The server computing system 1306 can identify historical weather data and/or forecasted weather data associated with the geographic location, and provide such as the external data 1342 to the computing device 1302. In some examples, the external data 1342 can include data regarding environmental conditions of the geographic location of the outdoor furniture piece 1304, such as i) a temperature forecast for the geographic location of the outdoor furniture piece 1304; ii) a wind forecast for the geographic location of the outdoor furniture piece 1304; iii) historical weather data for the geographic location of the outdoor furniture piece 1304; and iv) precipitation trends for the geographic location of the outdoor furniture piece 1304.

The temperature control management computing module 1312 can train, based on the telemetry data 1340 and the external data 232, the temperature control management model 1330. Specifically, the temperature control management computing module 1312 can generate, based the telemetry data 1340 and the external data 1342 at the first time, a configuration policy 1332 that includes configuration rules 1334.

To that end, the temperature control management computing module 1312 can train the temperature control management model 1330 to establish connections between i) the telemetry data 1340 and the external data 1342 and ii) the configuration rules 1334. Specifically, the temperature control management model 1330 can identify one or more configurations rules 1334 to be applied based on a connection with one or more of the telemetry data 1340 and the external data 1342. In some examples, the temperature control management computing module 1312 can train the temperature control management model 1330 using a machine learning process, and/or a neural network.

In some examples, the configuration rules 1334 can include automatically adjusting the electrical energy output by the power source 1326. In some examples, the configuration rules 1334 include increasing the electrical energy output by the power source 1326. In some examples, the configuration rules 1334 include decreasing the electrical energy output by the power source 1326. In some examples, the configuration rules 1334 can include automatically adjusting the electrical energy output by the power source 1326. In some examples, the configuration rules 1334 include adjusting the electrical energy output by the power source 1326 without user interaction. In some examples, the configuration rules 1334 can include automatically adjusting the electrical energy output by the power source 1326 based on a correspondence of the adjusted electrical energy to a temperature at the cushion 1324. In some examples, the configuration rules 1334 can include automatically adjusting the electrical energy output by the power source 1326 based on a correspondence of the adjusted electrical energy to a temperature at the cushion 1324 without user interaction. In some examples, the configuration rules 1334 can include automatically increasing the electrical energy output by the power source 1326 based on a correspondence of the adjusted electrical energy to a temperature at the cushion 1324. In some examples, the configuration rules 1334 can include automatically decreasing the electrical energy output by the power source 1326 based on a correspondence of the adjusted electrical energy to a temperature at the cushion 1324.

In some examples, the configuration rules 1334 can include providing a notification to a display screen of the computing device 1302. For example, the notification can indicate a recommended action to be taken by the user of the outdoor furniture piece 1304 with respect to the outdoor furniture piece 1304.

In some examples, the temperature control management computing module 1312 can perform the calibration and the configuration of the temperature control management model 1330 iteratively. In some examples, the temperature control management computing module 1312 can perform the calibration and the configuration of the temperature control management model 1330 multiple times.

The temperature control management computing module 1312 can perform, at a second time (after the first time), a steady-state management of the temperature control of the heating element 1322 of the outdoor furniture piece 1304. Specifically, the temperature control management computing module 1312 can monitor the telemetry data 1340 associated with the sensors 1320. The sensors 1320 can provide the telemetry data 1340 to the computing device 1302. The sensors 1320 can provide the telemetry data 1340 in response to a request from the computing device 1302, or automatically. In some examples, the sensors 1320 can provide the telemetry data 1340 periodically, e.g., every 1 millisecond, 1 second, 1 minute, 1 hour, 1 day. Further, the temperature control management computing module 1312 can monitor the external data 1342 from the server computing system 1306. The server comping system 1306 can provide the external data 1342. The server computing system 1306 can provide the external data 1342 in response to a request from the computing device 1302, or automatically. In some examples, the server computing system 1306 can provide the external data 1342 periodically, e.g., every 1 millisecond, 1 second, 1 minute, 1 hour, 1 day.

The temperature control management computing module 1312 can, in response to monitoring the telemetry data 1340 and the external data 1342, access the temperature control management model 1330 including the configuration policy 1332. The temperature control management computing module 1312 can further identify one or more of the configuration rules 1334 based on the monitored telemetry data 1340 and/or the external data 1342. Furthermore, the temperature control management computing module 1312 can apply the configuration rules 1334 to the power source 1326, and in particular, apply the configuration rules 1334 to perform adjustment of the electrical energy output by the power source 1326. In other words, the temperature control management computing module 1312 can apply appropriate configuration rules 1334 based on the monitored telemetry data 1340 and the monitored external data 1342 as provided by the temperature control management model 1330. In some examples, the temperature control management computing module 1312 can apply the configuration rules 1334 to the power source 1326, and in particular, apply the configuration rules 1334 to perform adjustment of the electrical energy output by the power source 1326 without user interaction. In some examples, the temperature control management computing module 1312 can apply the configuration rules 1334 to the power source 1326, and in particular, apply the configuration rules 1334 to perform adjustment of the electrical energy output by the power source 1326 to adjust the temperature of the heating element 1322.

In some examples, the temperature control management computing module 1312 can apply the configuration rules 1334 to the power source 1326, and in particular, apply the configuration rules 1334 to provide a notification to the display screen of the computing device 1302. For example, the notification can indicate a recommended action that can be taken by the user of the outdoor furniture piece 1304 with respect to the outdoor furniture piece 1304.

In some examples, the temperature control management computing module 1312 can perform, at the second time period, the steady-state management of the temperature control of the heating element 1332 of the outdoor furniture piece 1304 when an occupancy sensor of the sensors 1320 indicates the occupancy of the user. That is, the temperature control management computing module 1312 can perform, at the second time period, steady-state management of the temperature control of the heating element 1332 when the user is "sitting" upon the outdoor furniture piece 1304, and thus, triggering an occupancy sensor of the sensor 1320 to indicate such occupancy of the user. In some examples, the second time period can include a time of day and a day of week.

In some examples, the temperature control management computing module 1312 can perform the steady-state management of the temperature control of the heating element 1332 of the outdoor furniture piece 1304 iteratively.

In a use case example, the temperature control management computing module 1312 can monitor the telemetry data 1340 and the external data 1342 and identify a particular environmental temperature surrounding the outdoor furniture piece 1304, a temperature setting provided by a user of the outdoor furniture piece 1304, and a time associated with occupancy of the outdoor furniture piece 1304 by the user. In response, the temperature control management computing module 1312 can access the temperature control management model 1330, identify the configuration rules 1334 that are applicable to i) the environmental temperature surrounding the outdoor furniture piece 1304, ii) the temperature setting, and iii) the time associated with occupancy of the outdoor furniture piece 1304 by the user, and apply such configuration rules 1334. For example, the temperature control management computing module 1312 can apply configuration rules 1334 to continuously adjust the electrical energy output (e.g., non-linearly or linearly) by the power source 1326 to maintain a substantially constant temperature at the cushion 1324. For example, the user typically sets the temperature setting 60 degrees Fahrenheit (F) greater than the environmental temperature surrounding the outdoor furniture piece 1304 between the hours of 7 pm-10 pm. On a particular night, at 7 pm, the environmental temperature surrounding the outdoor furniture piece 1304 is 50 degrees F., and the electrically energy output by the power source 1326 is automatically adjusted to obtain a temperature at the cushion 1324 of 110 degrees F. Further, on the particular night, at 9 pm, the environmental temperature surrounding the outdoor furniture piece 1304 is 40 degrees F., and the electrically energy output by the power source 1326 is automatically adjusted to obtain a temperature at the cushion 1324 of 120 degrees F.

In a use case example, the temperature control management computing module 1312 can monitor the telemetry data 1340 and the external data 1342 and identify a particular environmental temperature surrounding the outdoor furniture piece 1304, a temperature setting provided by a user of the outdoor furniture piece 1304, a time associated with occupancy of the outdoor furniture piece 1304 by the user, a wind forecast for the geographic location of the outdoor furniture piece 1304, and a humidity forecast for the geographic location of the outdoor furniture piece 1304. In response, the temperature control management computing module 1312 can access the temperature control management model 1330, identify the configuration rules 1334 that are applicable to i) the environmental temperature surrounding the outdoor furniture piece 1304, ii) the temperature setting, iii) the time associated with occupancy of the outdoor furniture piece 1304 by the user, iv) the wind forecast for the outdoor furniture piece 1304, and v) the humidity forecast for the outdoor furniture piece 1304, and apply such configuration rules 1334. For example, the temperature control management computing module 1312 can apply configuration rules 1334 to continuously adjust the electrical energy output (e.g., non-linearly or linearly) by the power source 1326 to maintain a substantially constant temperature at the cushion 1324. For example, the user typically sets the temperature setting 60 degrees Fahrenheit (F) greater than the environmental temperature surrounding the outdoor furniture piece 1304 between the hours of 7 pm-10 pm. On a particular night, at 7 pm, the environmental temperature surrounding the outdoor furniture piece 1304 is 50 degrees F., and the electrically energy output by the power source 1326 is automatically adjusted to obtain a temperature at the cushion 1324 of 110 degrees F. Further, on the particular night, at 9 pm, the environmental temperature surrounding the outdoor furniture piece 1304 is 40 degrees F., and the electrically energy output by the power source 1326 is automatically adjusted to obtain a temperature at the cushion 1324 of 120 degrees F.

In a use case example, the temperature control management computing module 1312 can monitor the telemetry data 1340 and the external data 1342 and identify a weather forecast for the particular geographic location of the outdoor furniture piece 1304, a historical temperature setting over a time period provided by a user of the outdoor furniture piece 1304, and a temperature setting provided by the user of the outdoor furniture piece associated with occupancy sessions (as indicated by the occupancy sensor) greater than a threshold amount of time. In response, the temperature control management computing module 1312 can access the temperature control management model 1330, identify the configuration rules 1334 that are applicable to i) the weather forecast for the particular geographic location of the outdoor furniture piece 1304, ii) historical temperature setting over a time period provided by a user of the outdoor furniture piece 1304, and iii) temperature setting provided by the user of the outdoor furniture piece associated with occupancy sessions greater than the threshold amount of time. For example, the temperature control management computing module 1312 can apply configuration rules 1334 to adjust the electrical energy output by the power source 1326 associated with a recommended temperature at the cushion 1324. For example, the user at a particular day and time, via the computing device 1302, receives a prompt indicating a "daily smart preset temperature" for the outdoor furniture piece 1304 for the particular day and time.

In a use case example, the temperature control management computing module 1312 can monitor the telemetry data 1340 and the external data 1342 and identify a temperature setting provided by a user of the outdoor furniture piece 1304, the date, and historical average temperature settings for a particular geographic region of the outdoor furniture piece 1304. In response, the temperature control management computing module 1312 can access the temperature control management model 1330, identify the configuration rules 1334 that are applicable to i) the temperature setting provided by a user of the outdoor furniture piece 1304, ii) the date and iii) the historical average temperature settings for a particular geographic region of the outdoor furniture piece 1304, and apply such configuration rules 1334. For example, the temperature control management computing module 1312 can apply configuration rules 1334 to adjust the electrical energy output by the power source 1326 associated with a recommended temperature at the cushion 1324. For example, the user typically sets the temperature setting at 92 degrees Fahrenheit (F) at a first geographic location of the outdoor furniture piece 1304. For a differing geographic location of another outdoor furniture piece, the historical average temperature for the differing geographic location is 30 degrees F. colder. The electrically energy output the power source 1326 is automatically adjusted to correspond to a temperature at the cushion 1324 of 122 degrees F.

In a use case example, the temperature control management computing module 1312 can monitor the telemetry data 1340 and the external data 1342 and determine historical temperature setting provided by a user of the outdoor furniture piece 1304, current weather predictions for the geographic location of the outdoor furniture piece 1304, historical weather conditions for the geographic location of the outdoor furniture piece 1304, and the date most often indicated by the occupancy sensor as occupied. In response, the temperature control management computing module 1312 can access the temperature control management model 1330, identify the configuration rules 1334 that are applicable to i) the historical temperature setting provided by a user of the outdoor furniture piece 1304, ii) the current weather conditions for the geographic location of the outdoor furniture piece 1304, iii) the historical weather predictions for the geographic location of the outdoor furniture piece 1304, and iv) the date most often indicated by the occupancy sensor as occupied, and apply such configuration rules 1334. For example, the temperature control management computing module 1312 can apply configuration rules 1334 to automatically adjust the electrical energy by the power source 1326 associated with a recommended temperature at the cushion 1324. Further, the temperature control management computing module 1312 can provide a notification indicating a recommendation of use by the user for a specific date/time.

In a use case example, the temperature control management computing module 1312 can monitor the telemetry data 1340 and the external data 1342 and identify a current temperature proximate to the outdoor furniture piece 1304 and a predicated precipitation proximate to the outdoor furniture piece 1304. In response, the temperature control management computing module 1312 can access the temperature control management model 1330, identify the configuration rules 1334 that are applicable to i) the current temperature proximate to the outdoor furniture piece 1304 and ii) the predicated precipitation proximate to the outdoor furniture piece 1304, and apply such configuration rules 1334. For example, the temperature control management computing module 1312 can apply configuration rules 1334 to provide a notification at the computing device 1302 to move the cushion 1324 inside when rain is predicted; provide a notification at the computing device 1302 to move the power source 1326 inside when the temperature is below a threshold; or provide a notification at the computing device 1302 to move the power source 1326 inside when the temperature is above a threshold.

FIG. 14 illustrates a flowchart depicting selected elements of an embodiment of a method 1400 for managing temperature control of a heating element of an outdoor furniture piece. The method 1400 may be performed by the information handling system 1200, the computing device 1302, and/or the temperature control management model 1330, and with reference to FIGS. 12-13. It is noted that certain operations described in method 1400 may be optional or may be rearranged in different embodiments.

The temperature control management computing module 1320 can perform, at a first time, a calibration and configuration of the temperature control management model 1330 (1402). The temperature control management computing module 1320 can identify telemetry data 1340 (1404) and external data 1342 (1406). The temperature control management computing module 1320 can train, based on the telemetry data 134 and the external data 1342, the temperature control management model 1330 (1408). In some examples, the temperature control management computing module 1320 can generate, based on the telemetry data 1340 and the external data 1342 identified at the first time, the configuration policy 1332 that includes the configuration rules 1334. In some examples, the configuration rules 1334 are rules for adjusting the electrical energy output by the power source 1326. The temperature control management computing module 1320 performs steady-state management of the temperature control management model 1330 (1410). The temperature control management computing module 1320 monitors the telemetry data 1340 (1412) and environmental conditions of the external data 1342 (1414). The temperature control management computing module 1320 can, in response to monitoring the telemetry data 1340 and the environmental conditions of the external data 1342, accesses the temperature control management model 1330 including the configuration policy 1332 (1416). The temperature control management computing module 1320 can further identify one or more of the configuration rules 1334 based on the monitored the telemetry data 1340 and the environmental conditions of the external data 1342 (1418). The temperature control management computing module 1320 can apply the configuration rule(s) 1418 to adjust the electrical energy output by the power source 1326 (1420).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for managing temperature control of a heating element of an outdoor furniture piece, comprising:
   performing, at a first time, a calibration and configuration of a temperature control management model, including:
      identifying telemetry data associated with one or more sensors of the outdoor furniture piece;
      receiving external data associated with environmental conditions of the outdoor furniture piece based on a geographic location of the outdoor furniture piece; and
      training, based on the telemetry data and the external data, the temperature control management model, including generating a thermal policy including configuration rules, the configuration rules for automatically adjusting electrical energy output by a power source in communication with the heating element;
   performing, at a second time, a steady-state management of the temperature control of the heating element of the outdoor furniture piece, including:
      monitoring the telemetry data associated with the sensors of the outdoor furniture piece;
      monitoring the environmental conditions of the outdoor furniture piece; and
      in response to monitoring the sensors and the environmental conditions, i) accessing the temperature control management model including the thermal policy, ii) identifying one or more of the configuration rules based on the monitored telemetry data and the monitored environmental conditions, and iii) applying the one or more configuration rules to perform adjustment of the electrical energy output by the power source.

2. The computer-implemented method of claim 1, wherein applying the one or more configuration rules to perform adjustment of the electrical energy output by the power source adjusts a temperature of the heating element.

3. The computer-implemented method of claim 1, wherein identifying the telemetry data associated with one or more sensors of the outdoor furniture piece further includes identifying ambient conditions associated with an environment of the outdoor furniture piece, the ambient conditions including i) a temperature of the environment proximate to the outdoor furniture piece, ii) a humidity of the environment proximate to the outdoor furniture piece, and iii) a pressure of the environment proximate to the outdoor furniture piece.

4. The computer-implemented method of claim 1, wherein identifying the telemetry data associated with one or more sensors of the outdoor furniture piece further includes identifying conditions at the outdoor furniture piece, including i) a temperature at a cushion of the outdoor furniture piece, ii) a moisture at the cushion of the outdoor furniture piece, iii) and an occupancy of a user at the cushion of the outdoor furniture piece.

5. The computer-implemented method of claim 4,
   wherein performing the calibration and configuration of the temperature control management model further includes identifying a first time period for which a particular sensor of the one or more sensors indicates the occupancy of the user, and
   wherein performing the steady-state management of the temperature control of the heating element of the outdoor furniture piece further includes monitoring a second time period for which the particular sensor indicates the occupancy of the user.

6. The computer-implemented method of claim 5, wherein the first time period includes a time of day and a day of week, and the second time period includes a time of day and a day of week.

7. The computer-implemented method of claim 1, wherein the power source is a rechargeable battery, and wherein identifying the telemetry data associated with one or more sensors of the outdoor furniture piece further includes identifying i) a voltage of the electrical energy output by the rechargeable battery, ii) a current capacity of the rechargeable battery, and iii) a health of the rechargeable battery.

8. The computer-implemented method of claim 1, wherein the external data associated with environmental conditions of the outdoor furniture piece includes i) a temperature forecast for the geographic location of the outdoor furniture piece, ii) a wind forecast for the geographic location of the outdoor furniture piece, iii) historical weather data for the geographic location of the outdoor furniture piece, and iv) precipitation trends for the geographic location of the outdoor furniture piece.

9. The computer-implemented method of claim 1, wherein performing the calibration and configuration of the temperature control management model is performed multiple times prior to performing the steady-state management of the temperature control of the heating element of the outdoor furniture piece.

10. An information handling system comprising a processor having access to memory media storing instructions executable by the processor to perform operations, comprising:
performing, at a first time, a calibration and configuration of a temperature control management model, including:
identifying telemetry data associated with one or more sensors of an outdoor furniture piece;
receiving external data associated with environmental conditions of the outdoor furniture piece based on a geographic location of the outdoor furniture piece; and
training, based on the telemetry data and the external data, the temperature control management model, including generating a thermal policy including configuration rules, the configuration rules for automatically adjusting electrical energy output by a power source in communication with a heating element of the outdoor furniture piece;
performing, at a second time, a steady-state management of the temperature control of the heating element of the outdoor furniture piece, including:
monitoring the telemetry data associated with the sensors of the outdoor furniture piece;
monitoring the environmental conditions of the outdoor furniture piece; and
in response to monitoring the sensors and the environmental conditions, i) accessing the temperature control management model including the thermal policy, ii) identifying one or more of the configuration rules based on the monitored telemetry data and the monitored environmental conditions, and iii) applying the one or more configuration rules to perform adjustment of the electrical energy output by the power source.

11. The information handling system of claim 10, wherein applying the one or more configuration rules to perform adjustment of the electrical energy output by the power source adjusts a temperature of the heating element.

12. The information handling system of claim 10, wherein identifying the telemetry data associated with one or more sensors of the outdoor furniture piece further includes identifying ambient conditions associated with an environment of the outdoor furniture piece, the ambient conditions including i) a temperature of the environment proximate to the outdoor furniture piece, ii) a humidity of the environment proximate to the outdoor furniture piece, and iii) a pressure of the environment proximate to the outdoor furniture piece.

13. The information handling system of claim 10, wherein identifying the telemetry data associated with one or more sensors of the outdoor furniture piece further includes identifying conditions at the outdoor furniture piece, including i) a temperature at a cushion of the outdoor furniture piece, ii) a moisture at the cushion of the outdoor furniture piece, iii) and an occupancy of a user at the cushion of the outdoor furniture piece.

14. The information handling system of claim 13,
wherein performing the calibration and configuration of the temperature control management model further includes identifying a first time period for which a particular sensor of the one or more sensors indicates the occupancy of the user, and
wherein performing the steady-state management of the temperature control of the heating element of the outdoor furniture piece further includes monitoring a second time period for which the particular sensor indicates the occupancy of the user.

15. The information handling system of claim 14, wherein the first time period includes a time of day and a day of week, and the second time period includes a time of day and a day of week.

16. The information handling system of claim 10, wherein the power source is a rechargeable battery, and wherein identifying the telemetry data associated with one or more sensors of the outdoor furniture piece further includes identifying i) a voltage of the electrical energy output by the rechargeable battery, ii) a current capacity of the rechargeable battery, and iii) a health of the rechargeable battery.

17. The information handling system of claim 10, wherein the external data associated with environmental conditions of the outdoor furniture piece includes i) a temperature forecast for the geographic location of the outdoor furniture piece, ii) a wind forecast for the geographic location of the outdoor furniture piece, iii) historical weather data for the geographic location of the outdoor furniture piece, and iv) precipitation trends for the geographic location of the outdoor furniture piece.

18. The information handling system of claim 10, wherein performing the calibration and configuration of the temperature control management model is performed multiple times prior to performing the steady-state management of the temperature control of the heating element of the outdoor furniture piece.

19. A non-transitory computer-readable medium storing software comprising instructions executable by one or more computers which, upon such execution, cause the one or more computers to perform operations comprising:
performing, at a first time, a calibration and configuration of a temperature control management model, including:
identifying telemetry data associated with one or more sensors of an outdoor furniture piece;
receiving external data associated with environmental conditions of the outdoor furniture piece based on a geographic location of the outdoor furniture piece; and
training, based on the telemetry data and the external data, the temperature control management model, including generating a thermal policy including configuration rules, the configuration rules for automatically adjusting electrical energy output by a power source in communication with a heating element of the outdoor furniture piece;

performing, at a second time, a steady-state management of the temperature control of the heating element of the outdoor furniture piece, including:
    monitoring the telemetry data associated with the sensors of the outdoor furniture piece;
    monitoring the environmental conditions of the outdoor furniture piece; and
    in response to monitoring the sensors and the environmental conditions, i) accessing the temperature control management model including the thermal policy, ii) identifying one or more of the configuration rules based on the monitored telemetry data and the monitored environmental conditions, and iii) applying the one or more configuration rules to perform adjustment of the electrical energy output by the power source.

20. The non-transitory computer-readable medium of claim 19, wherein applying the one or more configuration rules to perform adjustment of the electrical energy output by the power source adjusts the temperature of the heating element.

\* \* \* \* \*